(12) United States Patent  (10) Patent No.: US 7,734,570 B2
Bachman et al.  (45) Date of Patent: Jun. 8, 2010

(54) COLLABORATIVE LINKING SYSTEM WITH BI-DIRECTED VARIABLE GRANULARITY SEARCH ENGINE

(75) Inventors: Jonathan A. Bachman, Wellesley, MA (US); Christopher J. Sole, 127 Dickerman Rd., Newton, MA (US) 02461

(73) Assignee: Christopher J. Sole, Newton, MA (US)

( * ) Notice: Subject to any disclaimer, the term of this patent is extended or adjusted under 35 U.S.C. 154(b) by 1967 days.

(21) Appl. No.: 10/204,288

(22) PCT Filed: Feb. 16, 2001

(86) PCT No.: PCT/US01/04877

§ 371 (c)(1),
(2), (4) Date: Aug. 16, 2002

(87) PCT Pub. No.: WO01/61540

PCT Pub. Date: Aug. 23, 2001

(65) Prior Publication Data

US 2003/0050914 A1    Mar. 13, 2003

(51) Int. Cl.
*G06F 9/00* (2006.01)
(52) U.S. Cl. .......................... 707/101; 707/102; 707/10
(58) Field of Classification Search ................. 707/101, 707/6
See application file for complete search history.

(56) References Cited

OTHER PUBLICATIONS http://www.wilsonweb.com/wmt4/990301yahoo.htm.*
Interorganizational Collaboration in Supply Chain Management: What Drives Firms to Share Information with Their Trading Partners?; Madlberger, M.; Hawaii International Conference on System Sciences, Proceedings of the 41st Annual Jan. 7-10, 2008 pp. 1-10.*
The Role and Emerging Landscape of Data Pools in the Retail and Consumer Goods Industries; Schemm, J.; Legner, C.; Hawaii International Conference on System Sciences, Proceedings of the 41st Annual Jan. 7-10, 2008 pp. 1-10.*
Digital Consumer Networks and Producer-Consumer Collaboration: Innovation and Product Development in the Digital Entertainment Industry; Arakji, R.Y.; Lang, K.R.; System Sciences, 2007. HICSS 2007. 40th Annual Hawaii International Conference on Jan. 2007 pp. 1-10.*

* cited by examiner

*Primary Examiner*—David Y Jung
(74) *Attorney, Agent, or Firm*—Pierce Atwood LLP; Ralph Trementozzi; Christopher E. Everett

(57) ABSTRACT

The present invention is a system and method for shortening response time and reducing resource utilization in an electronic advertising and customer enquiry system, operating in an interactive communications and distributed database environment. The system is designed to enable customers (01) to easily find product and service offerings that match their requirements for immediate local accessiblity (A1), as well as the customer's (01) specific product desires. Where a perfect match does not exist, slightly less satisfactory solutions are offered. Such product offerings and customer (01) desires have static and dynamic characteristics that effect their electronic publication, enquiry, matching, and subsequent response.

34 Claims, 25 Drawing Sheets

Welcome to PlaceLinks

Intensely Local Shopping Search and Offers
Welcome to PlaceLinks, the perfect place to search for things you buy, as close as possible to where you live and work. We link you up with the best you can find in your place!

- PlaceLinks has easy local search to help you find brands, products, activities and stores near you.
- PlaceLinks gets you the best local promotions and coupons to help you save money and find exciting new things to try.
- Try FREE PlaceLinks Mailer news service to bring you timely news about your favorite brands and stores.

Where are you?
Town: [          ]  State: [MA ▼]  Zip: [          ]
[Go!]

Want to take the 30 second tour of what you can do? Click here.

Find a business or product—a new approach to the Yellow Pages

Sign up for the top coupon offers in your town.

---

Receive Favorites
PlaceLinks Mailer is your own Free shopping news service.
Sign Up Here

20% Off Broadband Access
MediaOne offers 20% off broadband Internet access to PlaceLinks users!

$1 Million Sweepstakes
Try a new magazine - and enter to win the $1,000,000 Sweepstakes.
Publishers House

---

Privacy policy | Advertise with PlaceLinks | Company Information | Terms of Service
©1999 PlaceLinks

FIG. 17

Wellesley, MA    CChange Place    

Four Ways to Search

1. By Keyword

Search: [_____] Go!

Try entering business name, brand, product, activity or other keywords

2. By Categories

| | |
|---|---|
| Appliances (12) | Office (9) |
| Automotive (22) | Parties (5) |
| Banking (8) | Pets (18) |
| Beauty (14) | Professionals (73) |
| Clothing (17) | Real Estate (16) |
| Electronics (15) | Recreation (23) |
| Entertainment (26) | Schools (5) |
| Florists (8) | Stores (62) |
| Food (54) | Travel (44) |
| Home Interior (9) | Utilities (8) |
| Insurance (13) | Weddings (14) |
| Lawn & Garden (4) | |
| Medical (49) | More Categories ... |

3. By Businesses Names

A B C D E F G H I J K L M N O P Q R S T U V W X Y Z

4. By Special Offers

Brands: Delta, Izod, Sony
  Products: China, Fish, Gas, Kids Clothing, Pizza, TV
  Activity: Cleaning, Soccer Need Help Searching?

---

Receive Favorites
PlaceLinks Mailer is your own Free shopping news service.
Sign Up Here

Pizza and Soda for $8.99
Medium 1-Topping Pizza and 2-liter soda $8.99 plus tax. Domino's, Wellesley, 781-235-0020

Free Cleaning
Receive a Free Cleaning* when you sign up for our weekly or bi-weekly service. *Two month minimum. Call for details. MaidPro, Wellesley/Needham, 781-235-3900

$5 Off Dry Cleaning
$5.00 OFF Any Incoming Dry Cleaning Order of $25 or More. One per visit. Jaylin Cleaners, Wellesley

---

Return to Start | About PlaceLinks Wellesley | About PlaceLinks
©1999 PlaceLinks

FIG. 18

Wellesley, MA　　　　　　　　　　　　　　　CChange Place　　

Six Ways to Continue Your Search

1. Select a Business

| | | |
|---|---|---|
| Same Day Service Co. | Newton | 617-965-0775 |
| *Best Repair Service* | | |
| Newton Appliance | Newton | 617-969-1919 |
| *Same Day Service* | | |
| Poirier Sales & Service Corp | Newton | 617-558-5500 |
| *Widest Selection* | | |
| Same Day Service Co. | Newton | 617-244-4944 |
| Daddario J D Co Inc. | Newton | 617-630-0100 |
| Dependable Appliance Service | Newton | 617-558-9997 |
| Commonwealth | Brookline | 617-731-1800 |
| Maytag-Newton Appliance Service | Newton | 617-969-1919 |
| Sears Appliance Repair | Natick | 800-469-4663 |
| KC Appliance | Needham | 781-444-4707 |
| Ryan Appliance | Needham | 781-444-0408 |
| Brookline Appliance Center Inc. | Newton | 617-527-4840 |
| Flynn's Appliance Repair | Newton | 617-965-0597 |
| Affordable Applianc | Wellesley | 781-237-2553 |
| Javis Hotpoint Appliances | Wellesley | 781-235-5112 |

Order By: Alphabet, Category, Proximity, Offer

2. Select a Brand
Amana, Asko, Asea, Bosch, Caloric, Carrier, Dacor, Frigidaire, Gaggenau, GE, GE/Hotpoint, Insinkerator, Jenn-Air, Kenmore, Kitchenaid, Maytag, Miele, Modern Maid, Russell, Sears, Subzero, Tappan, Thermador, Traulsen, Viking Professional, Whirlpool

3. Select a Product
Air Conditioner, Compactor, Dishwasher, Disposal, Dryer, Electric Stove, Freezer, Gas Stove, Microwave Oven, Oven, Range, Refrigerator, Room Air Conditioner, Stoves, Washer

4. Select an Activity
Kitchen Design

5. Enter Qualifying Keywords
Search: [          ] Go!
Try entering business name, brand, product, activity or other keywords

6. Expand search to Neighboring towns, or move to Dover, Natick, Needham, Weston

---

Receive Favorites
PlaceLinks Mailer is your own Free shopping news service.
Sign Up Here

Best Repair Service
We provide free service call when we repair, Exact written quotes, 3,000 parts stocked on every truck, All competitor coupons accepted, Over 90% of appliances repaired on the same day, and a Seniors Discount. Same Day Service Co. Inc.

Same Day Service
Authorized Maytag and In-Sink-Erator Sales & Same Day Service. Newton Appliance

Widest Selection
Visit our Newton Or Norwood Showrooms to view the wide selection of major appliances and repair parts. Poirier Sales & Service

Advertise on this Page

---

Return to Start | About PlaceLinks Wellesley | About PlaceLinks
©1999 PlaceLinks.
Portions ©1999 Acxiom.

FIG. 19

| | CChange Place | PlaceLinks |
|---|---|---|

Six Ways to Continue Your Search

1. Select a Business

Commonwealth                                              Brookline   617-731-1800

Order By: Alphabet, Category, Proximity, Offer

2. Select a Brand
Amana, Asko, Asea, Bosch, Caloric, Carrier, Dacor, Frigidaire, Gaggenau, GE, GE/Hotpoint, Insinkerator, Jenn-Air, Kenmore, Kitchenaid, Maytag, Miele, Modern Maid, Russell, Sears, Subzero, Tappan, Thermador, Traulsen, Viking Professional, Whirlpool

3. Select a Product
Air Conditioner, Compactor, Dishwasher, Disposal, Dryer, Electric Stove, Freezer, Gas Stove, Microwave Oven, Oven, Range, Refrigerator, Room Air Conditioner, Stoves, Washer

4. Select an Activity
Kitchen Design

5. Enter Qualifying Keywords
Search: [          ] Go!
Try entering business name, brand, product, activity or other keywords

6. Expand search to Neighboring towns, or move to Dover, Natick, Needham, Weston

Receive Favorites
PlaceLinks Mailer is your own Free shopping news service.
Sign Up Here

Electricians
Experienced electricians in Wellesley.
Cedrone Electric

Architects
We design additions and homes.
American Architectural

Advertise on this Page

Return to Start | About PlaceLinks Wellesley | About PlaceLinks
©1999 PlaceLinks
Portions ©1999 Acxion.

*FIG. 20*

Wellesley, MA
and Dover, Natick, Needham, Weston

CChange Place

Six Ways to Continue Your Search

1. Select a Business

| | | |
|---|---|---|
| Commonwealth | Brookline | 617-731-1800 |
| Framingham Appliance | Framingham | 508-655-1485 |
| Waltham Appliance Service | Waltham | 781-891-0896 |

1999 Freezer Savings

Order By: Alphabet, Category, Proximity, Offer

2. Select a Brand
Amana, Asko, Asea, Bosch, Caloric, Carrier, Dacor, Frigidaire, Gaggenau, GE, GE/Hotpoint, Insinkerator, Jenn-Air, Kenmore, Kitchenaid, Maytag, Miele, Modern Maid, Russell, Sears, Subzero, Tappan, Thermador, Traulsen, Viking Professional, Whirlpool

3. Select a Product
Air Conditioner, Compactor, Dishwasher, Disposal, Dryer, Electric Stove, Freezer, Gas Stove, Microwave Oven, Oven, Range, Refigerator, Room Air Conditioner, Stoves, Washer

4. Select an Activity
Kitchen Design

5. Enter Qualifying Keywords
Search: [_____] Go!
Try entering business name, brand, product, activity or other keywords

6. Expand search to Neighboring towns, or move to Dover, Natick, Needham, Weston

---

Receive Favorites
PlaceLinks Mailer is your own Free shopping news service.
Sign Up Here

1999 Freezer Savings
Buy a Miele Freezer for 20% off before Thanksgiving and we will buy the turkey! Waltham Applicance Service

Advertise on this Page

---

Return to Start | About PlaceLinks Wellesley | About PlaceLinks
©1999 PlaceLinks
Portions ©1999 Acxiom

FIG. 21

Newton, MA                                    CChange Place    

Back to last result

| E-mail to a friend | Print friendly version | Add to Favorites |

Business Listing
Waltham Appliance Service
781-891-0896
101 Moody
Waltham, MA 02833
Email: buster@wathamappliance.com
Web: www.wathamappliance.com

Categories
Appliances

Active Promotions
1999 Freezer Savings

Business Details
Hours: 8-5 pm
Brands: Miele
Products: Dishwasher, Freezer

Navigation
See a map
Get directions
Businesses on Moody Street
Businesses in this Category or Industry

Back to last result

Clear Search and Start Again

---

PlaceLinks Mailer
Add this business to your favorites

1999 Freezer Savings
Buy a Miele Freezer for 20% off before Thanksgiving and we will buy the turkey! Waltham Applicance Service

Miele Web Site
Miele – Homepage of Miele, manufacturing a wide range of products from washing machines to vacuum cleaners, with product and company info.

---

Return to Start | About PlaceLinks Wellesley | About PlaceLinks
©1999 PlaceLinks
Portions ©1999 Acxiom

*FIG. 22*

| | |
|---|---|
| Shop at Your Local Store and Save up to 25%!<br>Visit our Wellesley Store<br>at JCPenney's Biggest Sale of the Year!<br>Use Promotional Code "CSBIG". | JCPenney |

Place Links

PlaceLinks Mailer Message

Dear Jonathan,

Here's your chance to get 25% off apparel, shoes, bath, window, home decor, adult and juvenile bedding, or luggage.*

Your Biggest Sale Promotional Code is "CSBIG"
(Please write it down for later use or simply print out this page.)

Click here to begin shopping! Remember to enter Promotional Code "CSBIG" on the Shopping Bag page to receive your savings.

Print Brushed Cotton Jersey Tees $20-$22      Levi's Docker Jacket $250-$270

Or Save 15% on toys, electronics, furniture, sporting goods, or baby bedding and accessories!*

Click here to begin shopping! Remember to enter Promotional Code "CSBIG" on the Shopping Bag page to receive your savings.

Casio(R) Hand-held Color TV $99.99

FIG. 23A

Use Promotional Code "CSBIG" to save when you shop from our Online Store, or using our EOB (Electronic Order Blank), order from The Fall/Winter '99 Big Book(TM), The JCPenney Big Gift Book(TM), JCPenney "Signature Series" Catalogs (including Big & Tall Men, Women's Sizes 16W & Up, Tall Women, "J" for Style, Fashion Influences, Kids Book, and Window Authority).

Here's how it works:

- After you finish shopping, enter "CSBIG" in the Promotional Code Box at the bottom of the Shopping Bag page.
- Proceed with Checkout.
- Your applicable discount will be reflected in your pricing on the Order Checkout page.

The Biggest Sale only lasts through November 10, 1999, so order now!

*Offer valid on orders placed 11/1-11/10/99 from our on-line store, the JCPenney Fall/Winter '99 Big Book(TM), the JCPenney Big Gift Book(TM) and JCPenney "Signature Series" catalogs. Discount applies to regular prices and not "2-or-more" reduced prices, and includes catalog and internet orders from eligible catalogs on advertised lines of merchandise. Discounts do not apply to Value Right Merchandise, Cookware & Small Kitchen Electrics, Catalog Jewelry, Video Games & Equipment, Floor Care, Aerosoles(R), Easy Spirit(R), Evan Picone(R), Hanes(R), FUBU, JNCO (R), Royal Velvet(R) by Fieldcrest(R), Sealy(R), Crown Jewel(R), Bose(R), Whirlpool(R), or in combination with any other JCPenney discount offer. This discount may not be used to purchase Gift Certificates or Membership Services and may not be applied to orders already placed. Offer good through 11/10/99.

--Your Friends at PlaceLinks.com

Visit PlaceLinks Today. Thank you for your interest in PlaceLinks.

If you feel you have received this message in error, or if you no longer wish to receive reminders, please forward this message to mailto:remove@PlaceLinks.com

FIG. 23B

PlaceLinks Mailer

Sign up to get email about your favorite stores, brands, product categories and activities. Then value ideas will start to arrive by email. You can stop or change at any time. PlaceLinks matches your interests with those stores or brands -- so you get the latest news and the very best values.

How to Get Started with PlaceLinks Mailer
Think about the most favorite brands or stores you have. About hot shopping activities that you need to get done (a vacation, a birthday present, a new child). Or about favorite hobbies (dancing, football games, collecting). Give PlaceLinks Mailer your email address, and some news will start to arrive. Be as specific as possible.

Email privacy policy

Examples:
    Reebok - *Local*
    Estee Lauder - *City*
    MTV - *Nation*

Your Top Stores

| | | | |
|---|---|---|---|
| [        ] | Local | City | Nation |
| [        ] | Local | City | Nation |

Your top Brands

| | | | |
|---|---|---|---|
| [        ] | Local | City | Nation |
| [        ] | Local | City | Nation |

Your Top Products

| | | | |
|---|---|---|---|
| [        ] | Local | City | Nation |
| [        ] | Local | City | Nation |

Your Top 3 Activities

[        ]
[        ]
[        ]

[ Continue ]

Return to Start | About PlaceLinks Wellesley | About PlaceLinks
©1999 PlaceLinks

*FIG. 24*

COLLABORATIVE LINKING SYSTEM WITH BI-DIRECTED VARIABLE GRANULARITY SEARCH ENGINE

CROSS REFERENCE TO RELATED APPLICATIONS

This application claims benefit of priority from U.S. Provisional Patent Application Ser. No. 60/182,749, entitled Collaborative Linking System with Bi-directed Variable Granularity Search Engine, filed Feb. 16, 2000.

FIELD OF THE INVENTION

Generally, the present invention relates to networked computer systems. More specifically, the present invention relates to computer systems and search engines used to selectively link members from any of a plurality of classes of users via any of a plurality of network enabled, wired or wireless, computers (or electronic devices).

BACKGROUND OF THE INVENTION

Internet usage has become immense and promises to be much larger in the amount of information stored and made available to it users. In fact, the quantity of accessible information content and the number of requests for information are growing much more rapidly then the ability to deliver the desired information. This delivery is limited by the power of the available processors, database machines, and communication bandwidth available and limited by the ability of the humans and their local computers (or electronic devices) to receive and process the data returned. Considerable research has been carried out to create more efficient search engines that attempt to minimize the actual data access, data communications, and querying required to satisfy the user's real need.

The great thrust of the Internet is characterized by the thrust of the "World Wide Web," suggesting that all of the information stored, worldwide, can be accessed by all of the users, worldwide via increasing numbers and types of wired or wireless computers, such as workstations, personal computers, cell phones, pagers, and personal organizers, just to name a few. Research, applications, and usage have been concentrated on this worldwide accessibility, such that the reach and access of a Web user seems limitless.

However, with the apparent focus on increasing a user's reach and access to volumes of data, the Internet and World Wide Web, at times, is a forum of scarcely tapped potential on a community level. That is, consumers and product and service providers have realized only marginal benefits from the Web in their mutual conduct of community level business transactions.

It is believed that as much as 85% of a consumer's purchases occur within 20 miles of the consumer's residence. Yet, presently, the Web does not link local consumers with local providers of goods and services in a scalable and efficient manner.

SUMMARY OF THE INVENTION

The present invention is a network-based collaborative linking system having bi-directed, variable granularity search engines configured to selectively link one or more members from a first class of users with one or more members from at least one other class of users. Each class member may interact with the collaborative linking system using a wired or wireless computer. Wherein, the word "computer" as used herein is to include, but is not limited to, those wireless devices, like cell phones, personal organizers, and pagers, which are network enabled and which allow their users (or class members) to interact with a network to send and receive messages, for example. In the case of pagers and personal organizers (i.e., receive only devices), it may be used to receive solicited or unsolicited advertisements, or announcements or e-mail with limited text, as an example. However, for the most part, messages may be include text, graphics (static and dynamic), or audio information, or some combination thereof.

In its simplest form, the collaborative linking system links members of a first class with members of a second class, wherein members of the second class generally seek information or data from members of the first class. Also, members of the first class may seek and use certain information related to members of the second class to facilitate more efficient and focused information providing. Each class may be generally characterized according to the application for which the collaborative linking system is to be applied. For example, in an e-commerce application, all members of the first class may be characterized as "providers" and all members of the second class may be characterized as "consumers".

The collaborative linking system may impose a general structure or framework on classes (e.g., consumers and providers), to facilitate efficient processing. Providers may selectively map their provider information into the framework and consumers may then search for provider information in a logical manner. By selectively mapping into certain areas of the collaborative linking system, a provider imposes a filter on its entry. From a consumer's perspective, by defining certain search criteria, within the context of the framework, the consumer defines a filter into the collaborative database for obtaining information. Given that the consumer can define and redefine his search criteria, the consumer can control the granularity of the search.

Within each class, members of that class may be grouped into subclasses, according certain criteria. Subclasses may or may not be hierarchical. That is, a subclass is constructed in accordance with certain criteria. Other than the criteria that defines the class generally (e.g., all providers), the other criteria that defines one subclass may be independent of the criteria that defines every other subclass. For example, a subclass of providers selling pizza may be independent from a subclass of providers selling skateboards, but they may both be part of an independent subclass of providers targeting consumers under the age of 21 years old. However, in a hierarchical context, an auto dealer subclass may be further subclassified into certain makers of automobiles (e.g., Chevrolet, Ford, etc.). In most embodiments, the collaborative linking system will include some combination of independent and hierarchical subclassifying.

Consumers may be similarly subclassified, either independently, hierarchically, or some combination thereof. As an example, consumers may be independently subclassified into age groups, that is, age group 1, or age group 2, or age group 3, or "all ages", and independently, they may be subclassified as male, or female, or both. Generally, the criteria of providers correspond to the criteria of consumers, such that the more refined the criteria (or search criteria) of a consumer the smaller the solution set of providers that will satisfy the consumer's criteria. Similarly, the more refined the criteria (or search criteria) of a provider the smaller the solution set of consumers that will satisfy the provider's criteria.

Classes, and their members, may be defined in any of a variety of manners, as dictated by the application for which the collaborative linking system is to be used. A member may be an individual, an organization, or some other type of entity. Preferably, the collaborative linking system is a Web-based system implemented over the Internet for e-commerce purposes. However, the collaborative system may also be implemented with other types of networks, such as, for example, a wide area network (WAN), local area network (LAN), or Intranet of an organization or affiliation or some combination thereof, and need not be restricted to e-commerce. Additionally, classes and their members may have different system privileges and the system may employ various known security mechanisms.

The collaborative linking system includes a plurality of wired and/or wireless computers (e.g., workstations, personal computers (PCs), cell phones, pagers, electronic personal organizers, Web enabled television, or other such interactive electronic devices) linked to one or more content servers and content databases of provider, and potentially consumer, information. The provider database content may include relatively static data, as well as short-term "promotional" or time critical dynamic data that may be of interest to consumers. In the preferred form, a control center having one or more control servers and associated control databases, serves as an entry point for selectively distributing and managing the distribution of providers' data to the content servers and content databases. The control center also establishes and manages, to some degree, the high level framework within which the classes operate. In addition to provider and consumer databases that may be provided as part of the collaborative linking system, third party databases may be linked to the system and the data therein used to facilitate improved satisfaction of the objectives of the collaborative linking system. For example, third party databases including directory listings, maps, SIC codes, Zip codes, telephone exchange numbers, and/or directions for getting from one place to another may be linked to, or imported into, the collaborative linking system.

A collaborative linking system program code is executable by one or more of said content servers and includes one or more bi-directed, variable granularity search engines. A search engine facilitates searches of, for example, provider content databases according to consumer's defined filters (i.e., search criteria). Based on a first level of search criteria, the search engine determines the appropriate one or more content servers and associated content databases most likely to satisfy the user's search. By continuing to add search criteria, additional (or more refined) filters are applied by the search engine to the content databases; thus, the user's search is further refined.

The collaborative linking system includes a plurality of user interfaces (UI) to facilitate the interaction of each of several types of users and computers (e.g., PC, cell phone, or pager) with the system. Preferably, each UI is generated from program code executed within a standard Web browser, on a user's workstation or PC, but the actual UI implementation will often vary as a function of the type of device with which a user interacts with the collaborative linking system. Each UI may be established with specific user privileges, having different levels of access and security. For example, a system administrator UI (SAUI) is provided to facilitate the configuring and maintenance of the system. A developer's UI (DUI) may also be provided for initial development and integration of system components and for performing functions similar to those accomplished using the SAUI. Preferably the SAUI and DUI are part of the control center. The control center is, for the most part, a logical center of the system and may or may not have all of its components physically collocated. Access to the control center may be local, remote, or some combination thereof, depending on the embodiment. In various embodiments, the collaborative linking system also includes UIs for billing and account management, which may be part of the SAUI or part of a separate UI.

A provider UI (PUI) may also be provided to allow each provider to directly add, modify, delete, and map the provider's information into the system's content servers and databases. As an alternative or a companion to the provider's direct entry, the system administrator may add, modify, delete, and map provider data into the system via the SAUI. Using the PUI a provider can also, preferably, establish a provider account on the collaborative linking system and take advantage of, for example, non-static information providing features of the system, such as, for example, offering specials to consumers.

To facilitate a consumer's interaction with the collaborative linking system, a consumer UI (CUI) is provided. The CUI facilitates a consumer's search for provider information by enabling the consumer to enter and create filters (i.e., search criteria) used to efficiently migrate through the collaborative linking system content servers and content databases to optimally locate relevant provider data, both static and dynamic. Screens displayed and information provided within the consumer's Web browser are a function of the framework, the providers' mapping of data into the framework, and the consumer's search criteria. Where appropriate, the UI screens generated by the collaborative linking system may include Web site and e-mail links.

A consumer may optionally enter consumer information into the collaborative linking system via the CUI and avail himself of an automatic linking capability that links providers and consumers as a function of a certain amount of synergy between the two. For example, the consumer's information may indicate that the consumer is an avid hiker and as local providers offer specials on hiking (or related) equipment, those providers and their specials are automatically identified to the consumer (e.g., via e-mail). Additionally, the collaborative linking system may selectively link consumers and providers using information obtained about the consumer's purchasing practices (or using other consumer related information), such that the consumer receives unsolicited provider promotional announcements. Preferably, a consumer may opt out of the distribution of unsolicited provider promotional announcements.

As will be appreciated by those skilled in the art, the various user interfaces may vary depending on the particular type of computer used. For example, the CUI for a PC may differ from the CUI for a cell phone, which may also differ from the CUI of an electronic organizer, and so on. Differences may be realized for each type of UI, among various types of computer devices.

BRIEF DESCRIPTION OF THE DRAWINGS

The foregoing and other objects of this invention, the various features thereof, as well as the invention itself, may be more fully understood from the following description, when read together with the accompanying drawings, described:

FIGS. 17-24 are screen display diagrams of the user interface of the collaborative linking system of FIGS. 1-16.

For the most part, and as will be apparent when referring to the figures, when an item is used unchanged in more than one figure, it is identified by the same alphanumeric reference indicator in all figures.

Trademarks of various entities are used herein as examples and do not indicate any specific relationship to the present invention. The trademarks used herein remain the property of their respective owners and nothing herein is intended to alter those property rights.

DETAILED DESCRIPTION OF THE PREFERRED EMBODIMENTS

In the preferred form, the collaborative linking system is applied in a Web-based e-commerce context. In such a context, a first class of users includes "providers", having members that include a plurality of retailers, service providers, restaurants, and so on. For the most part, in the preferred embodiment, a provider may be any type of entity found in a typical Yellow Pages phone book, for example. A second class of users includes "consumers", having members that include individuals, businesses, and so on. Preferably, providers and consumers interact with the collaborative linking system via any of a variety of wired or wireless types of computers (e.g., workstations, personal computers (PCs), cellular telephones, pagers, electronic personal organizers, Web enabled televisions, or other types of electronic devices).

Figure 1:
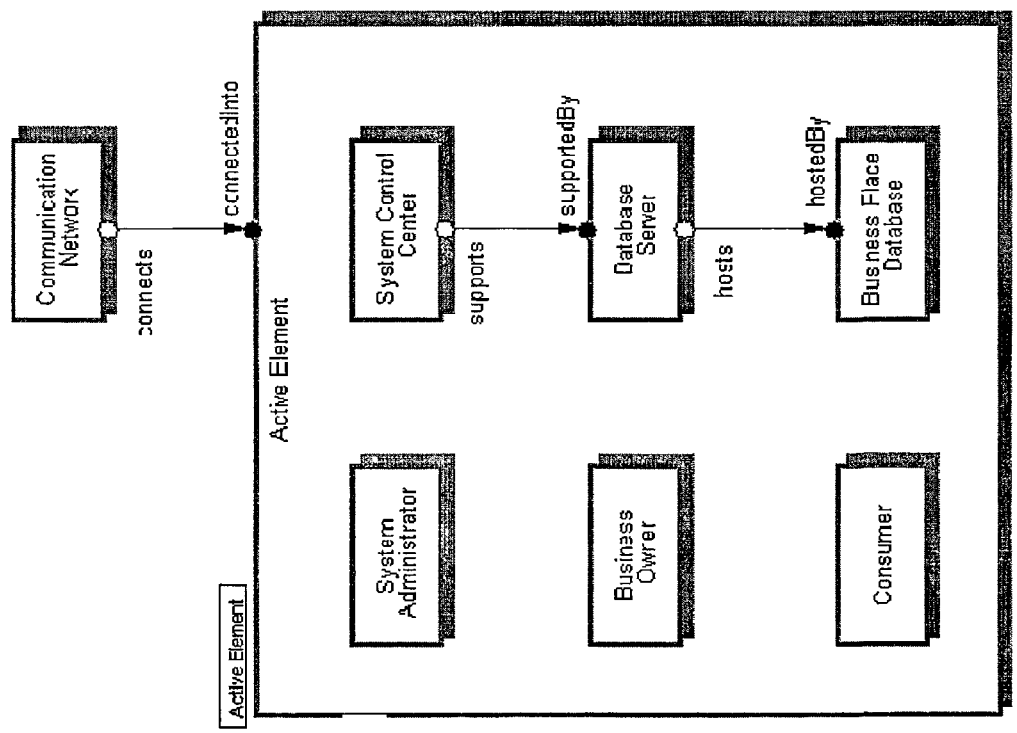
FIGS. 1-10 are diagrams illustrating the entity types and relationships of the preferred embodiment of a collaborative linking system, in accordance with the present invention.
Figure 2:
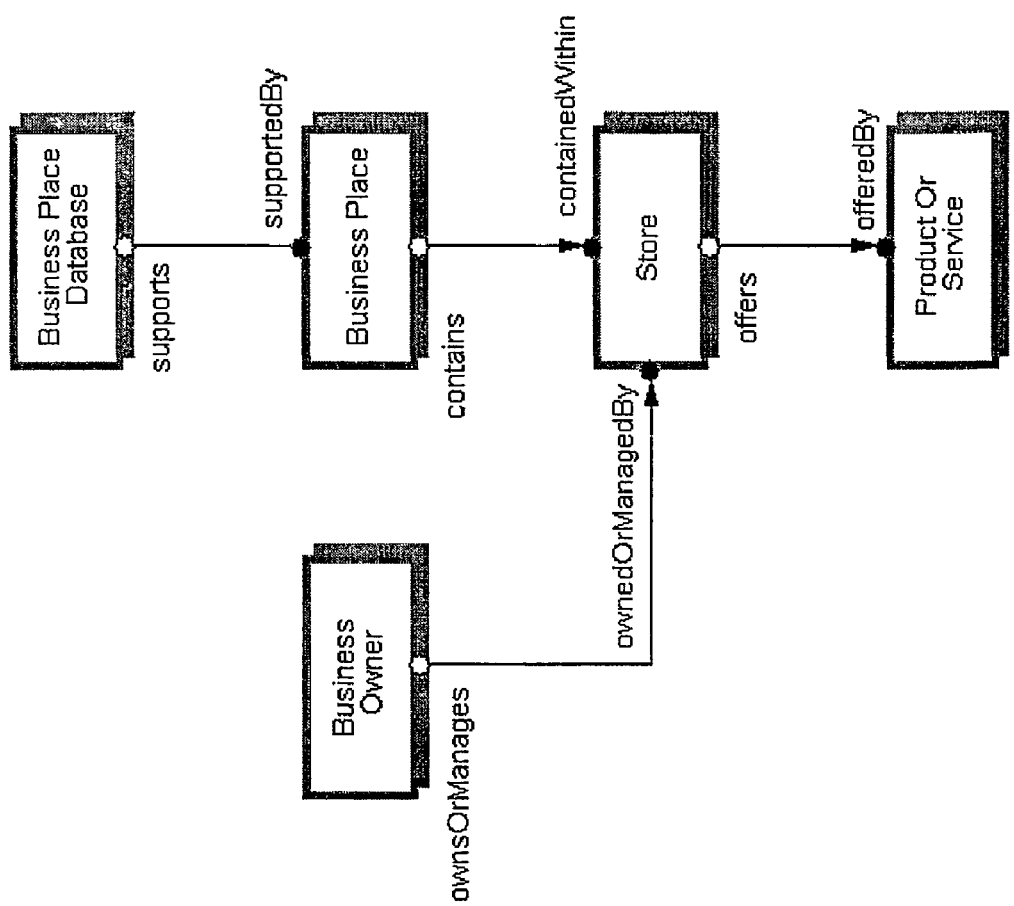
Figure 3:
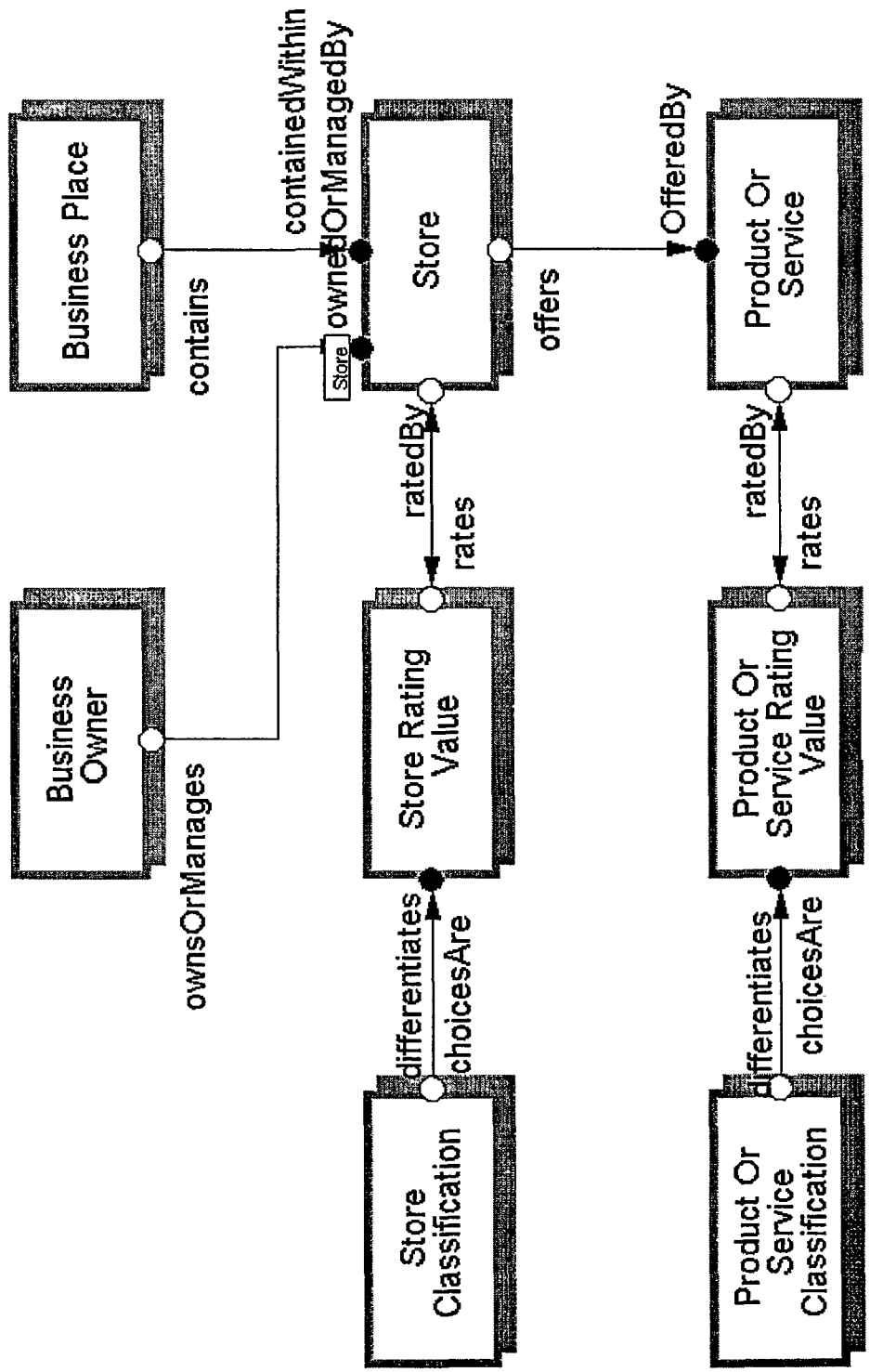
Figure 4:
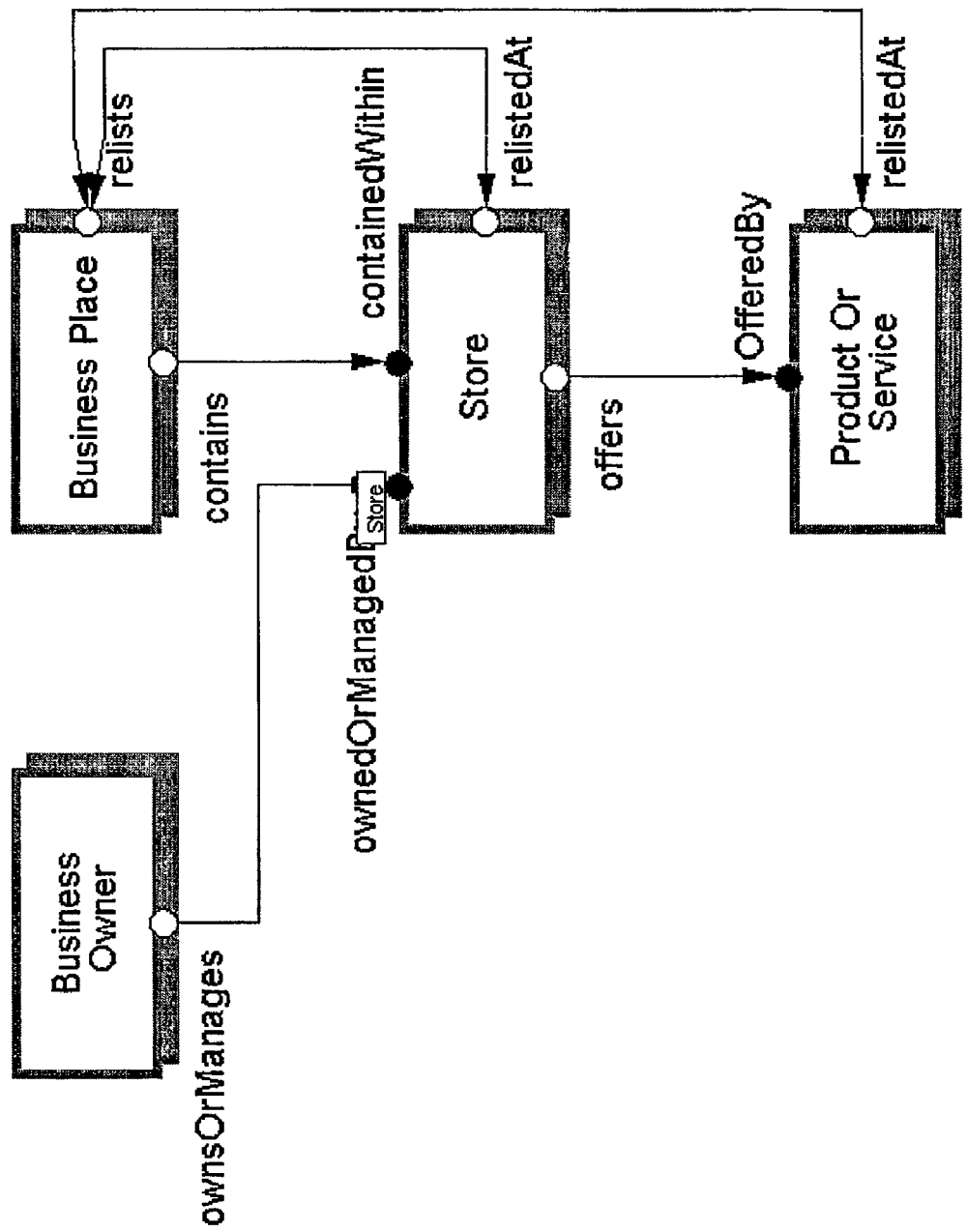
Figure 5:
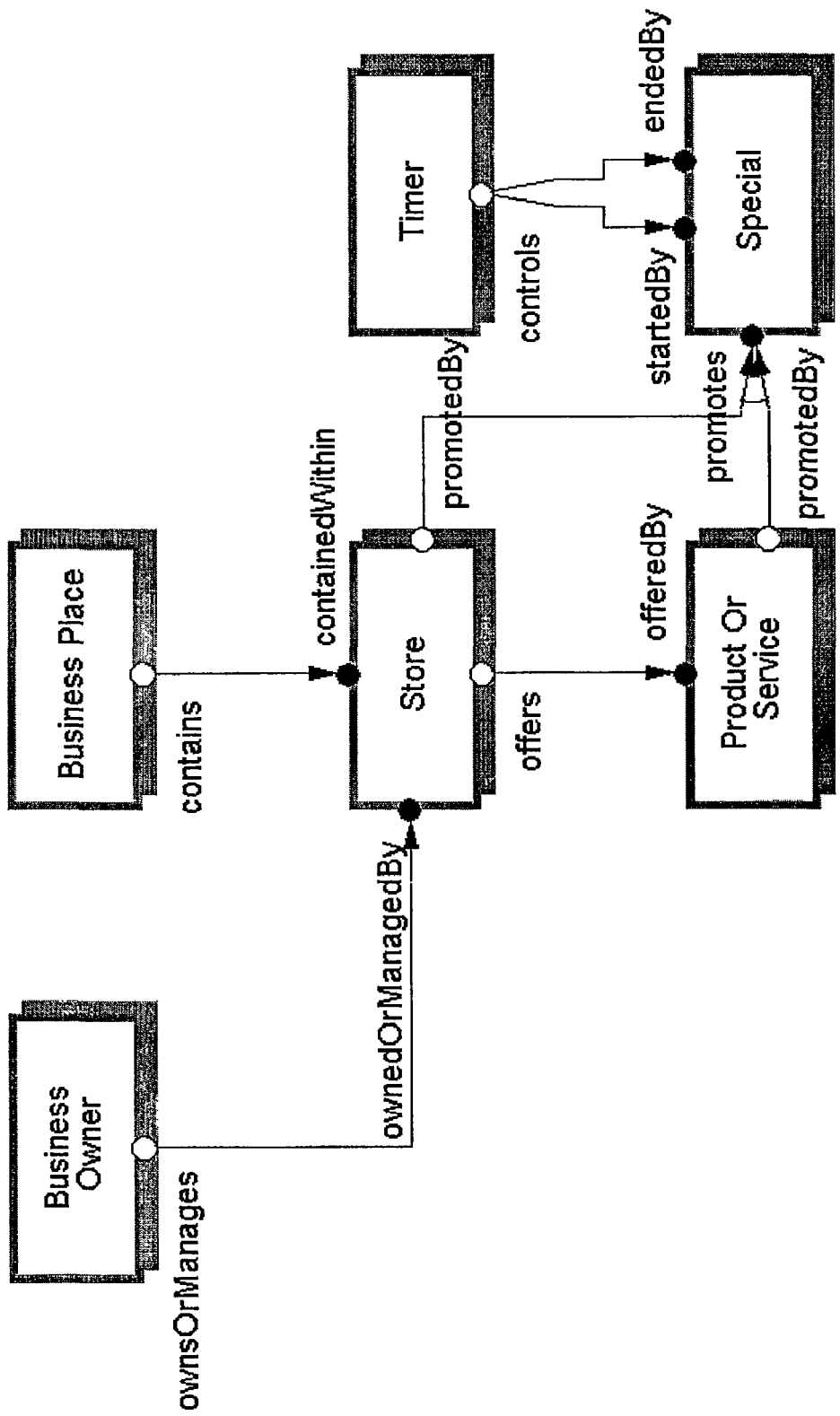
Figure 6:
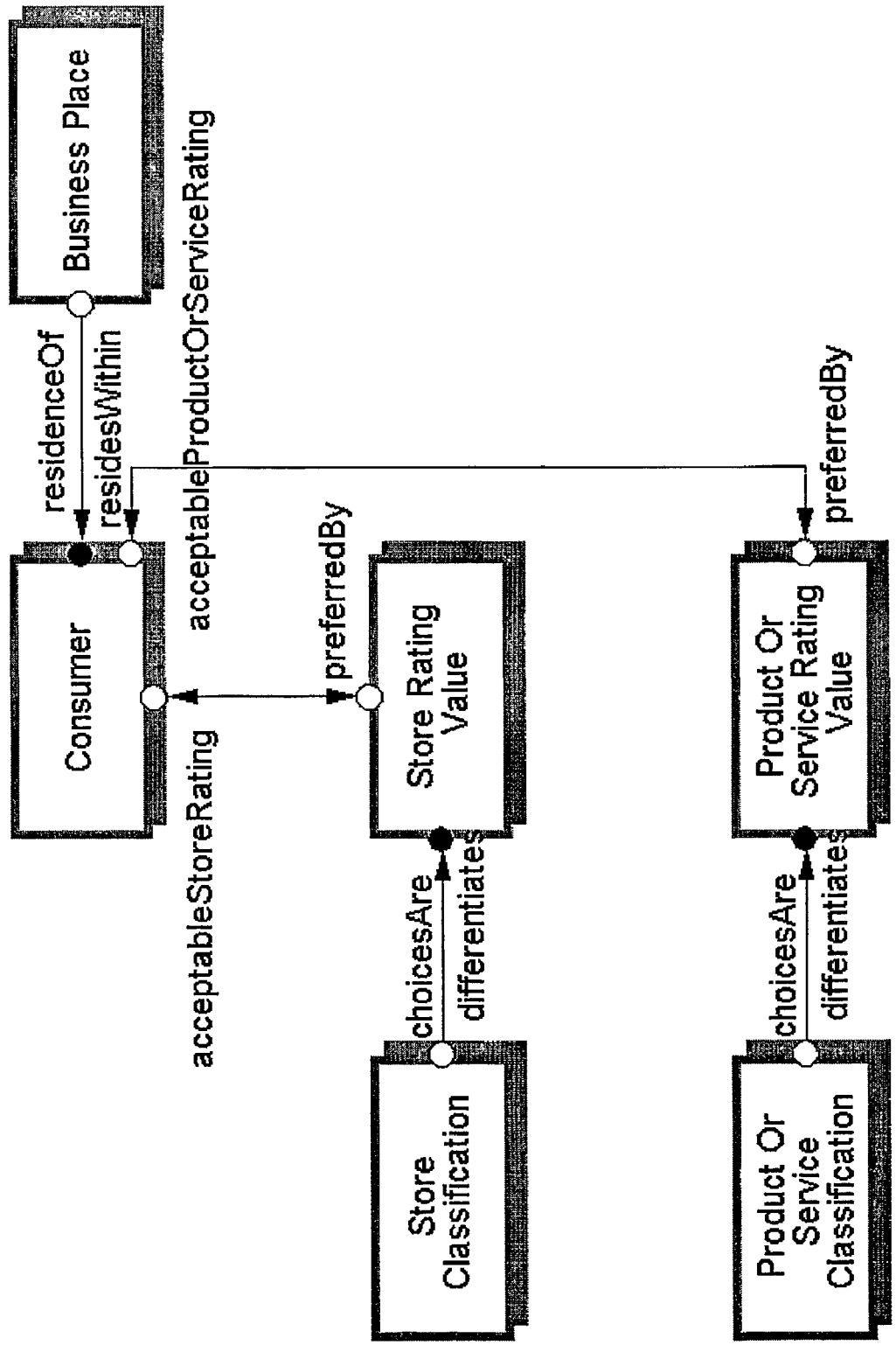
Figure 7:
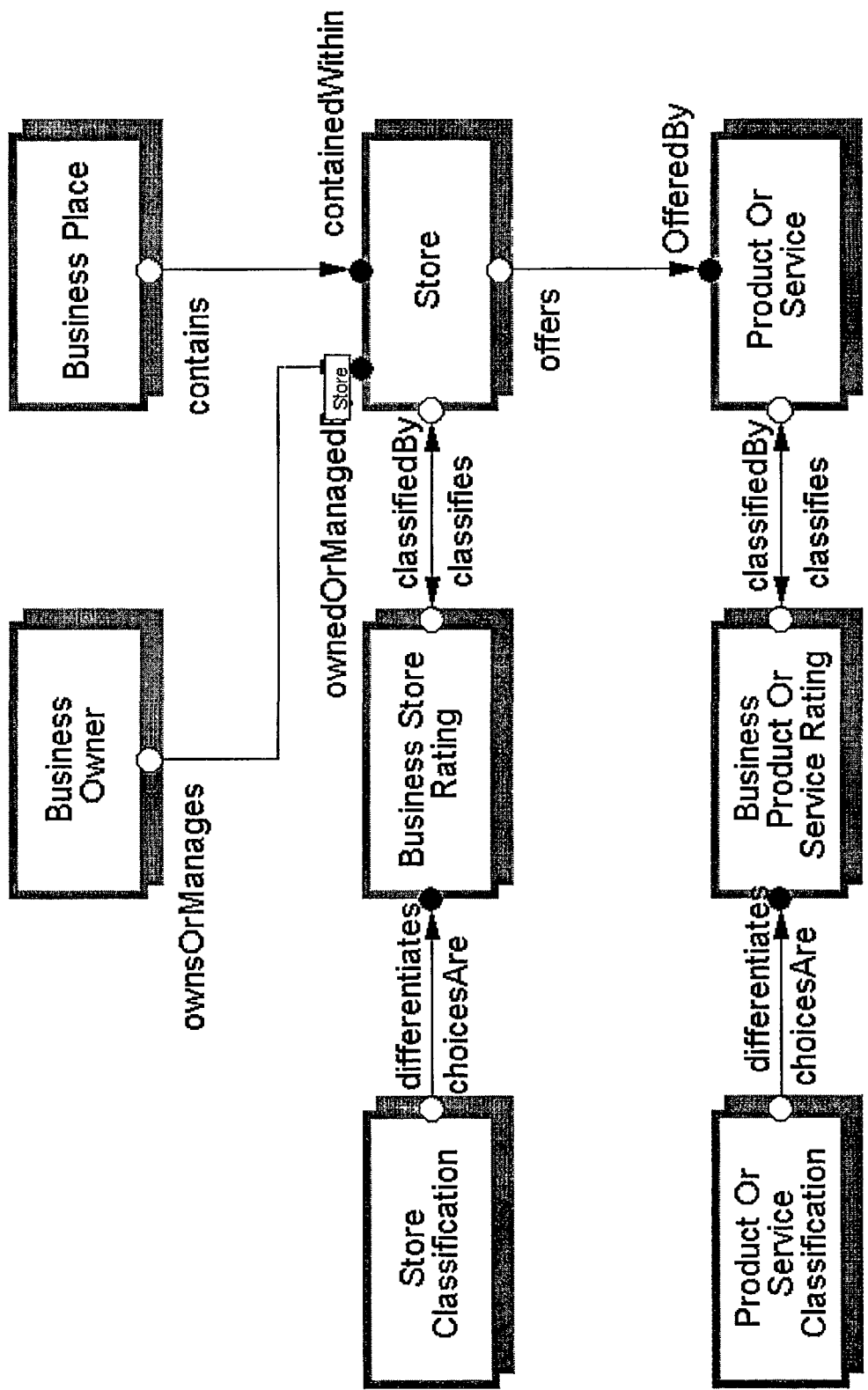
Figure 8:
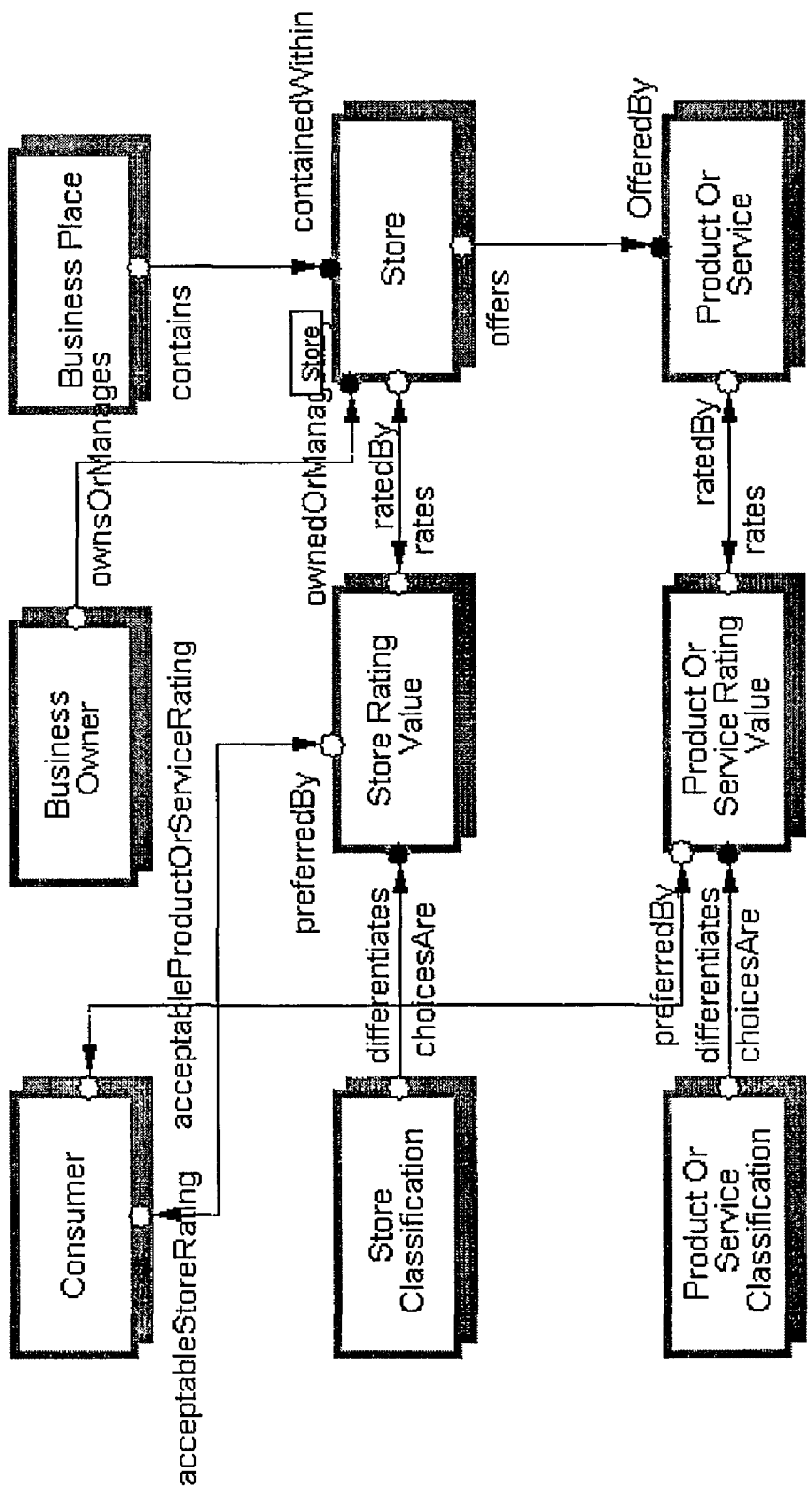
Figure 9:
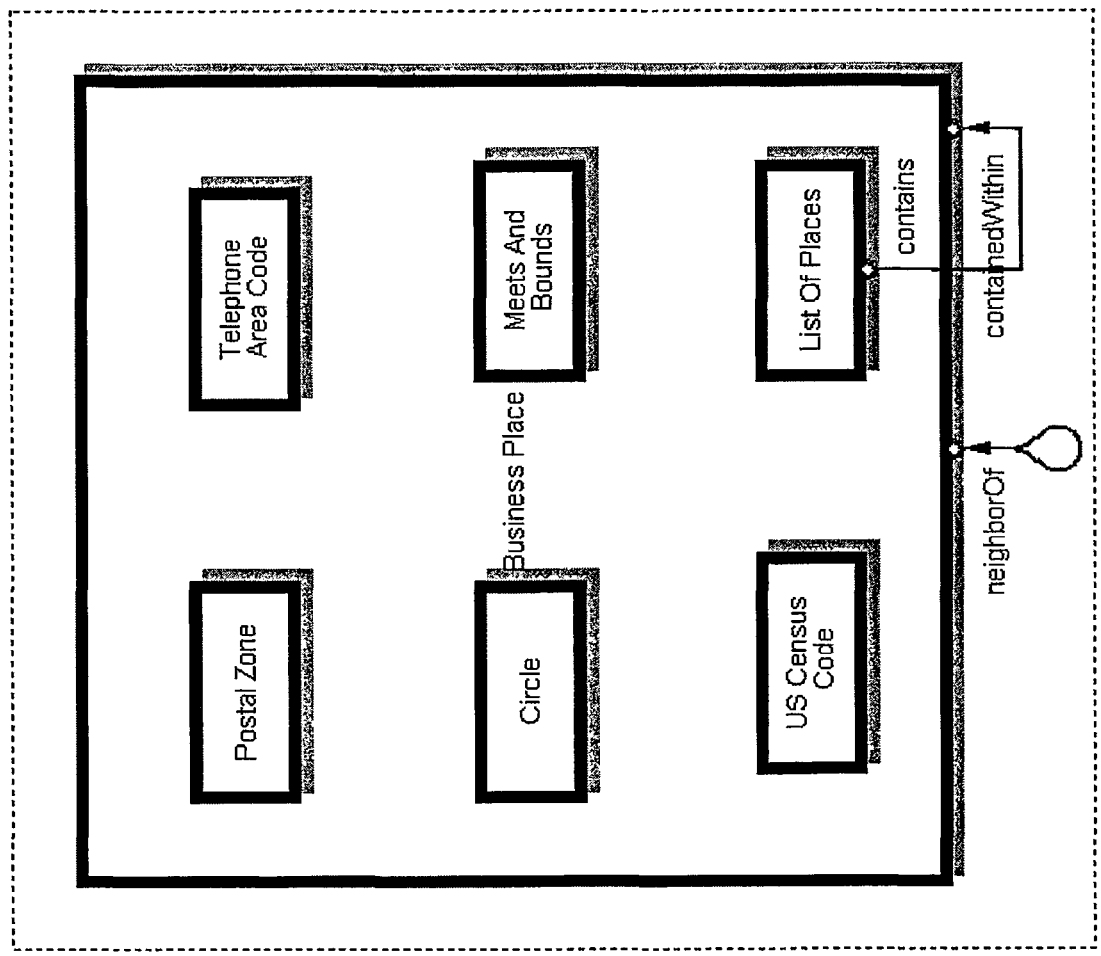
Figure 10:
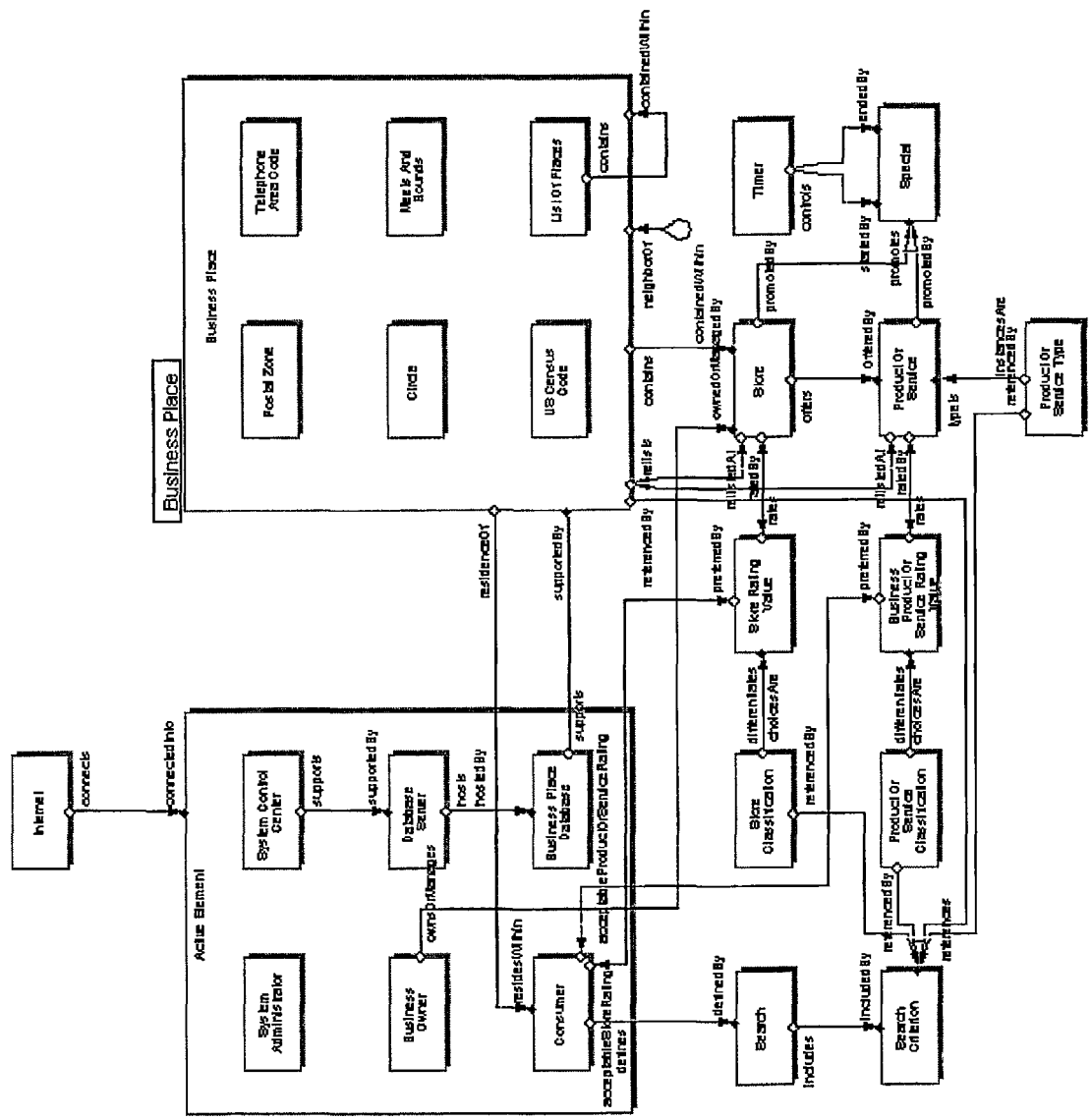

Members of each class (i.e., providers and consumers) may be grouped into subclasses based on additional criteria. Sub classifying may be either independent, relationship-based or some combination thereof. An example of relationship-based sub classifying is a hierarchical approach, but subclasses may be related in some other manner. In contrast, if a subclass is independent, it has no particular relationship to any other subclass within its class. Generally, a provider seeks to be linked to consumers in search of the provider's products or services. Similarly, a consumer seeks to be linked to providers that provide the products or services that the consumer desires. In some situations a provider may be a consumer, for example, in a business-to-business transaction. FIGS. 1-10 depict the entities and relationships of the preferred embodiment of the collaborative linking system.

The collaborative linking system of the preferred embodiment implements a structure that defines a first level of criteria for linking providers and consumers. In an e-commerce context, recognition that most people shop in their immediate vicinity for many products and services, such as for perishables, items or services they need in a relatively short time, and items they prefer to inspect before purchasing, leads to a preference for a geography-based framework or structure. Therefore, consumers and providers are linked, at a first level, in relation to a predetermined geographic region. For the most part, the provider's choice of geographic preference is more or less static, over a period of time, because of the general "bricks and mortar" aspect of providing products and services from a physical location. On the other hand, the consumer has greater physical mobility, so the collaborative linking system provides the capability to allow the consumer to dynamically specify his current geographic point of interest.

Figure 11:
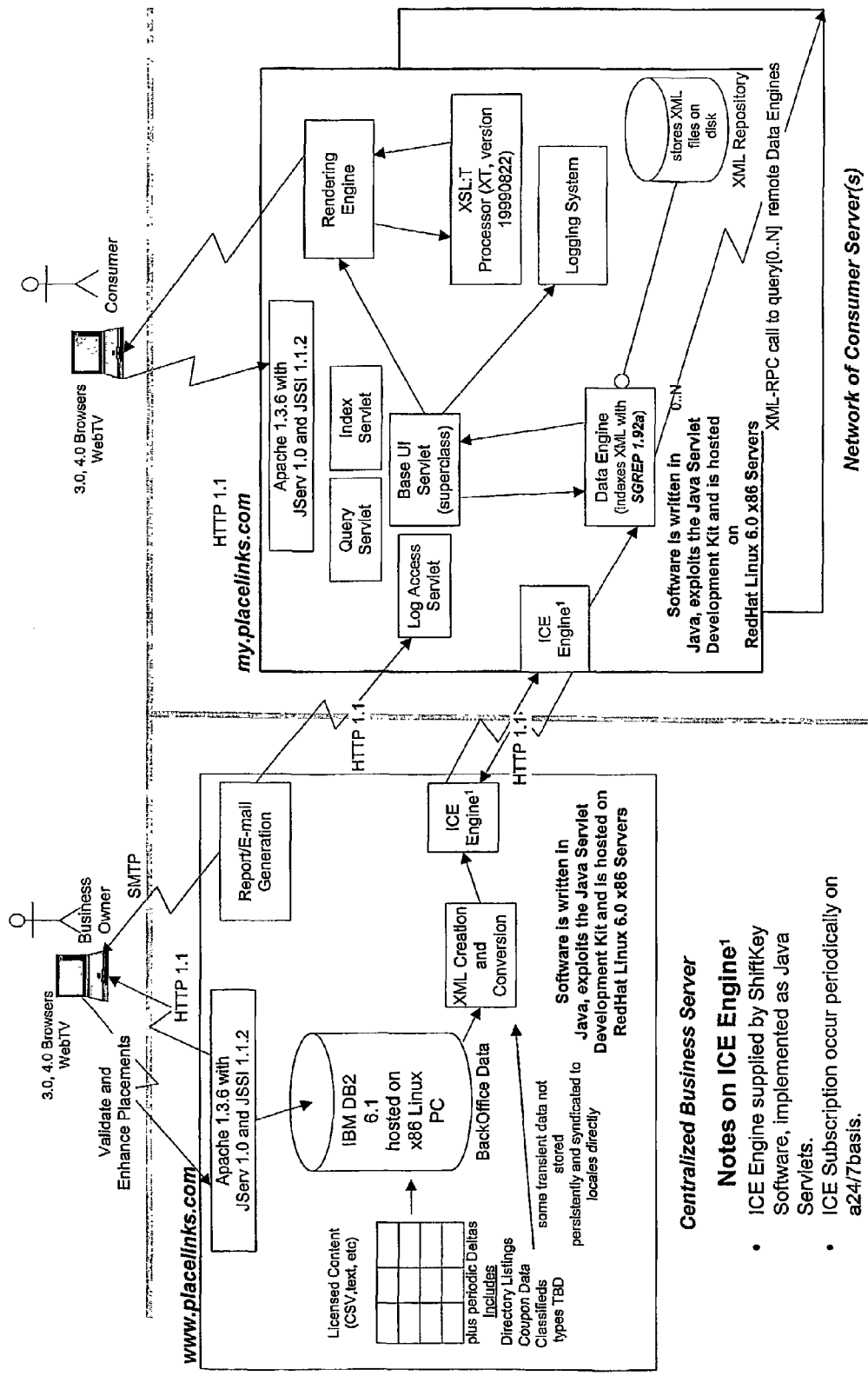
FIGS. 11-16 are architecture-based diagrams of portions of the collaborative linking system of FIGS. 1-10.
Figure 12:
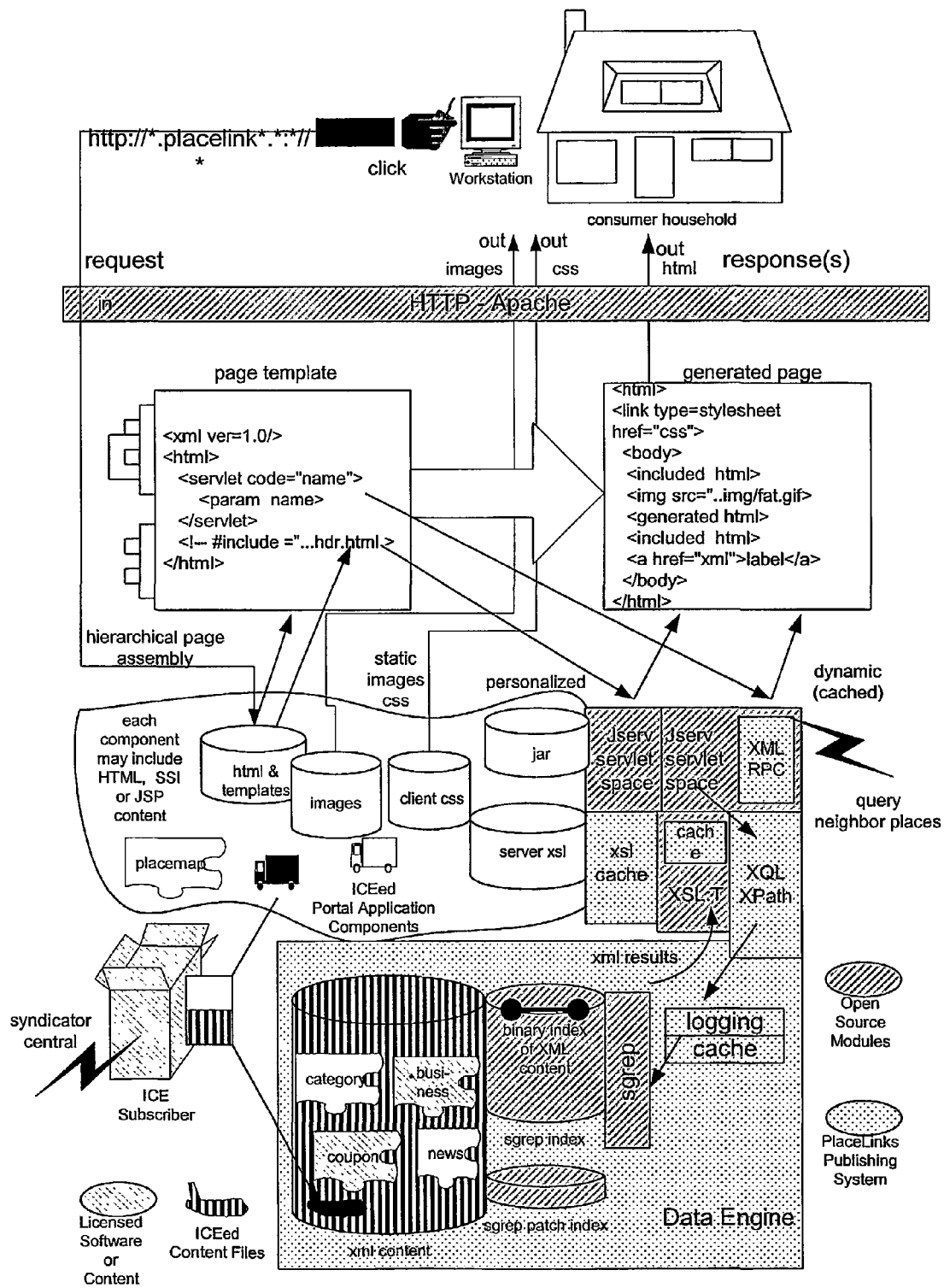
Figure 13:
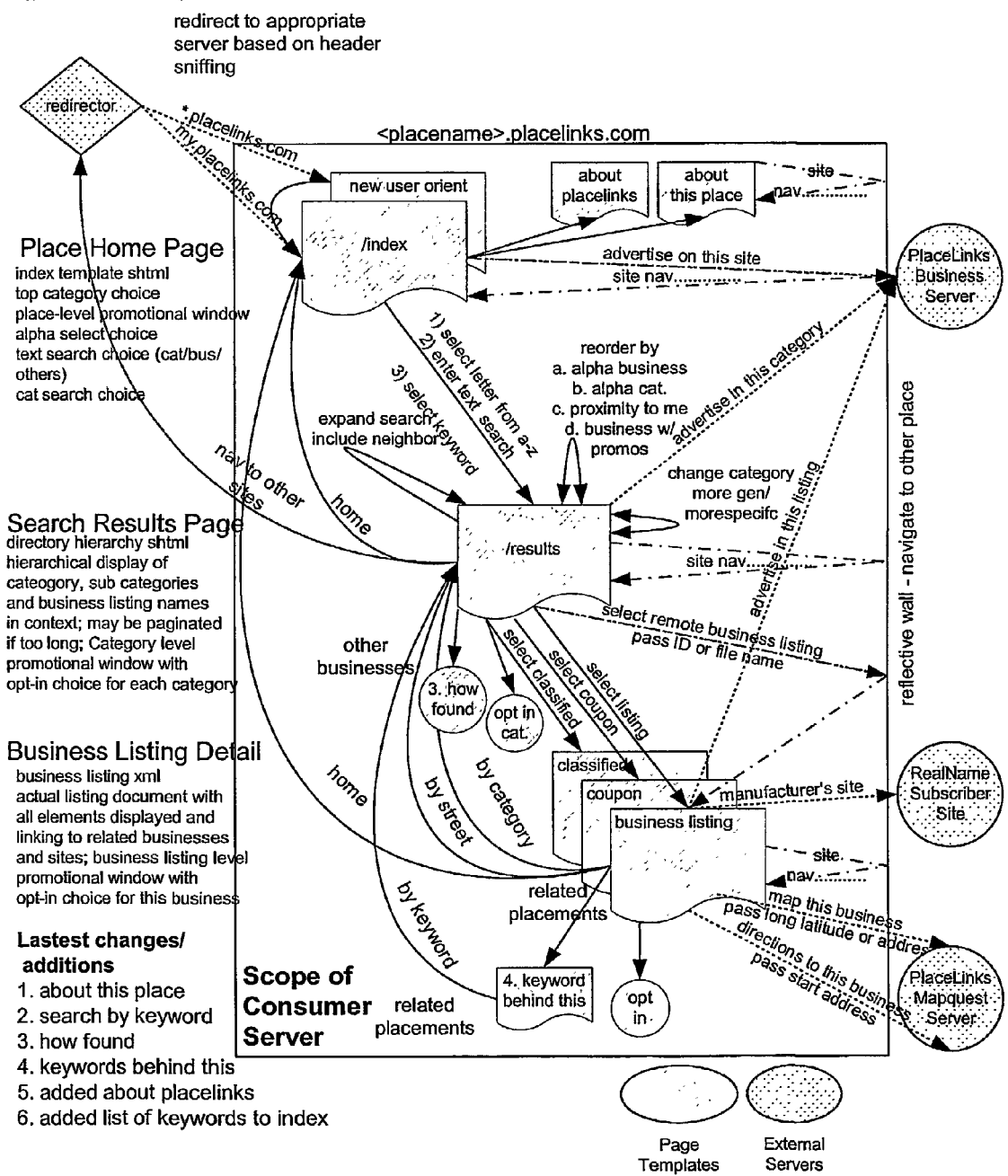
Figure 14:
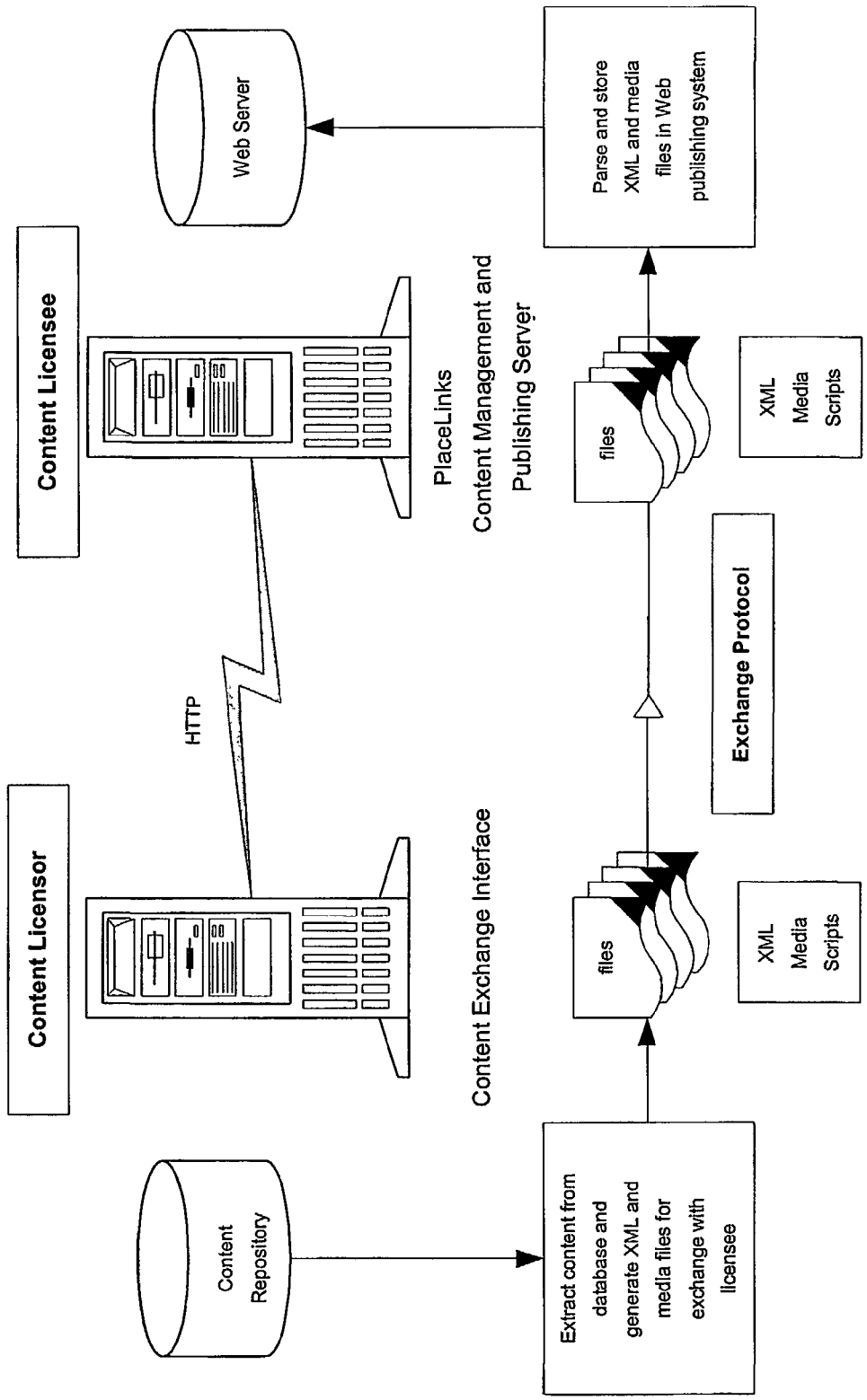
Figure 15:
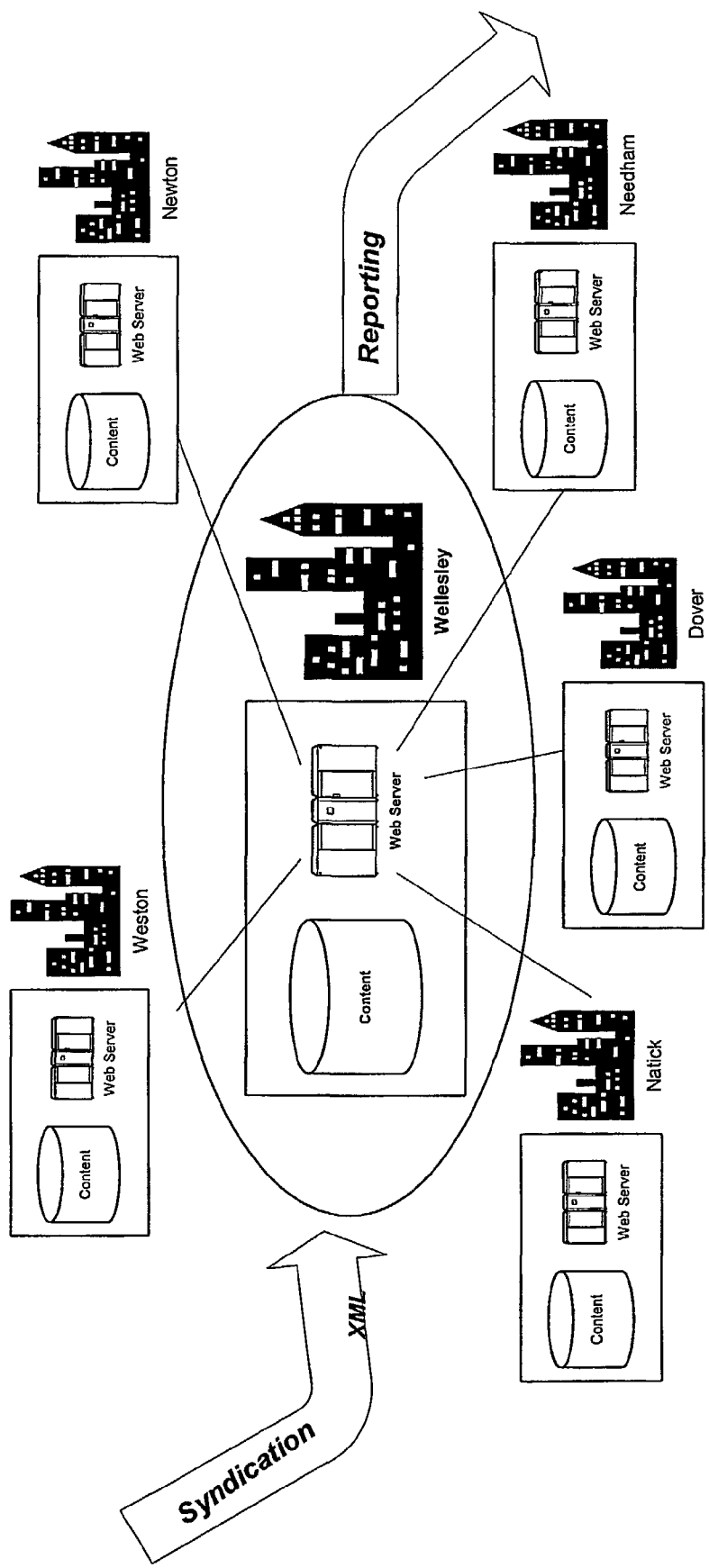
Figure 16:
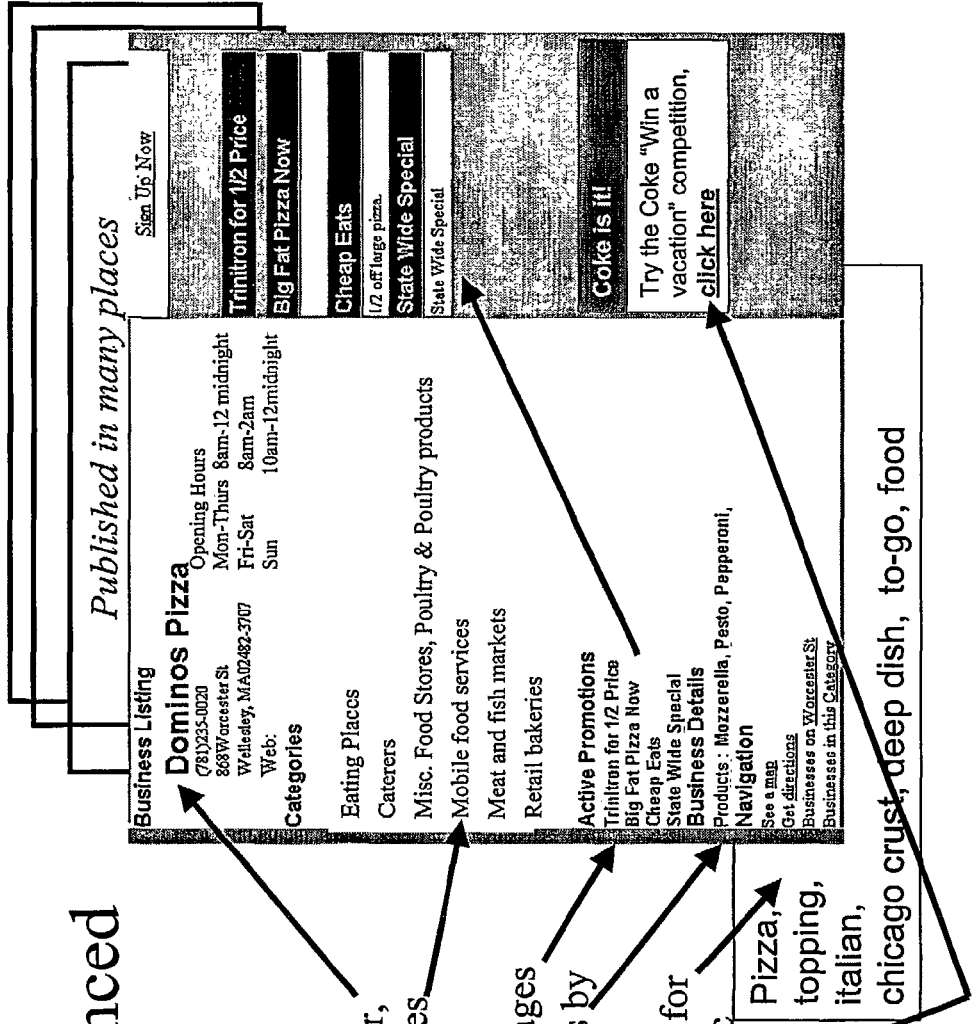

As an architectural implementation, a plurality of content servers and associated content databases are linked together under the general management of a control center and made accessible via the Internet and Web, as shown in FIGS. 11-16. Additionally, third party databases, information sources (and related functional code), functionality, networks, and systems may be linked to, or imported into, the collaborative linking system, such as databases including directory listings, maps, SIC codes, ZIP codes, telephone exchange numbers, directions for how to get from one place to another, credit information, financial account information and so forth. The content servers and databases are defined according to a geographic region, within the larger geography-based framework. Each provider maps its provider information into those geographical content servers and databases (i.e., "business places") that correspond to that provider's consumer base and/or that provider's storefront locations. A consumer searching for a particular product or service dynamically chooses a geographic region within which to search, that is, the consumer chooses a certain one or more content servers and databases. Preferably the content servers are physically located proximate to or within the geographic region that they serve. This geography-based architecture imposed on providers and consumers provides at least two performance benefits. First, if the consumer is searching a content server and database that is in or near his geographic location, transmission times between the consumer and the content server will be relatively short, due to fewer relays in the transmission path, among other things. Second, the server's response time (to the consumer's search request) will be relatively short, since the content database being searched contains only the data for that geographic region. Also, the more refined the consumer's search, the faster the search results are presented. Of course, in other embodiments, a geography-based structure need not be imposed; the choice of structure is made in light of several considerations and will vary depending on the application for which the collaborative linking system is used. Generally, the structure is chosen to enhance or optimize performance. In other architectures, content servers and databases may be dynamically allocated as a function of the availability of system resources.

A geographic region may be defined in any of a variety of manners, such as, for example, by postal codes, by telephone area codes and exchanges, by a circle defined by longitude and latitude values, by a set of points each with a longitude and latitude value, by governmental census tracks identifiers, or by a set of other geographic regions (places). The provider information (or data) may include information relating to the provider's location (e.g., the store's address), store hours, products and services offered and current promotions. The product information may include make, model, features, price, and quantity on hand. Additionally, providers may be rated and consumers may search for providers meeting a certain minimum rating threshold, for a given product of service.

While a user is most likely to inquire about providers in his geographic region, the user may optionally expand his search to include adjacent geographic regions or to search in remote geographic regions. Additionally, consumers may generally be willing to travel farther within their general geographic area for some products than for others. For example, the geographic region (or business place) for auto dealerships may be larger (in the consumer's mind) than the geographic region for pizza parlors. Thus, a provider may wish to list a particular place of business (e.g., an auto dealership) in multiple surrounding areas. Using the Internet and Web as a communications network, a consumer may seamlessly transition between business places, expand or contract a search, or change the product/service being searched.

In a broad context, the collaborative linking system is implemented for a large group of business places (i.e., towns), wherein each business place includes a plurality of businesses (or providers) offering products and services. A combination of business places may form a higher-level business place. For example, a large geographic region may be the United States ("U.S."), which may include a plurality of separate business places (or geographic sub-regions). A provider that has a presence (e.g., store or franchise) in many locations throughout the U.S. may then pick and choose within which business places to advertise each store. Presumably, the provider advertises in those regions where the provider has a physical presence. Additionally, a provider may pick and choose within which business places certain products will be promoted. For example, a department store provider may, in the month of January, promote snow scrapers in Massachusetts and sun glasses in Florida, but not vice versa. However, if the provider is a mail order business with no traditional storefronts, that provider may chose to advertise only in business places having consumers that have demonstrated a demand for the provider's mail order products or may advertise in all business places.

In the preferred embodiment, the collaborative linking system includes the control center, having access to the control servers and control databases. The control center accomplishes the system administration, management, maintenance, modifications, upgrades, and so forth of the collaborative linking system, as well as establishing the basic framework of the system. The control center provides a mechanism for the storage and subsequent mapping of provider data into business places (i.e., business place content servers and databases) and administration of links to third parties (e.g., provider Web sites or third party databases or services). Although, third parties need not link to the collaborative linking system through the control center; they may link to a proximate content server. In the preferred embodiment, providers seeking to offer promotions (e.g., advertise sales or distribute coupons), derive or collect consumer information or derive other benefits beyond a static listing from the collaborative linking system are referred to as "syndicators", and derive such benefits by establishing an account that is managed through the control center. Other providers may simply have their static information (e.g., non-promotional information) provided to consumers.

The collaborative linking system provides a mechanism for providers to use consumer information to tailor or otherwise influence their marketing approach. For example, geographically related consumer information may be added into the system, such as average household income, number of homeowners, political and religious affiliations and other census information, and so on for a geographic region. Additionally, other consumer related information (e.g., number of "hits", consumer preferences, and consumer activity patterns) may be collected by the system, as part of consumer's use of the collaborative linking system. This information may then be used by providers in determining which products and specials are to be offered in a given geographic region, which types of ads are most effective, and which ads are most effective relative to the time of day, among other things. Use of this information may be by overt provider selection, or as an automated function of the application of automated filters. For example, a kitchen appliance company may only promote certain appliances in the towns where the company has a distributor and where new home construction is higher than 5%. Once a town's new home sales drop below 5%, the collaborative linking system may automatically cease promotions on those appliances in that town.

In the preferred embodiment, the collaborative linking system user interface is comprised of at least three user-type interfaces: a system administrator user interface (SAUI), a provider user interface (PUI), and a consumer user interface (CUI). That is, the SAUI includes a plurality of displays useful by system administrator personnel for monitoring, data gathering, troubleshooting, analyzing, modifying, upgrading, configuring, enhancing, testing, and otherwise operating and maintaining the collaborative linking systems and the information thereon. The SAUI may also be used for billing and account management purposes. Also, the SAUI may be used to add, modify, and delete provider and consumer data and to establish and maintain links to third party systems and databases. Access to certain aspects of the collaborative linking system for system administration purposes may vary as a function of predetermined user privileges. For the most part, system administration is conducted via the control center.

The PUI allows a provider to access information related to that provider on the collaborative linking system. In the preferred form, the collaborative linking system databases are populated with relatively static provider data within a geographic context for substantially each provider in a selected business place. As previously discussed, such relatively static provider data typically includes a provider name, address, and telephone number (which may collectively be referred to as a "listing"). Such information is entered into the system via the SAUI or by the provider via the PUI. Using the PUI, a provider may "register" with or establish an account on the collaborative linking system and subsequently view, add, delete, or modify its provider data. Registered providers are required to logon to the collaborative linking system in order to interact with their provider data. Using the PUI, for example, a provider may define promotional specials, change or update provider data and view statistical information related to their listing and specials. Appendix A (and its figures) describes an embodiment of the PUI.

For the consumer, the collaborative linking system CUI provides, preferably, a hierarchical, link or text-based search approach to finding providers relative to a chosen geographical region, as a first level criterion. Decreasing recall and increasing accuracy of results is achieved with the addition of subsequent criteria by the consumer, as indicated in the CUI screen prints of FIGS. 17-24. In the preferred embodiment, the consumer interacts with the collaborative linking system via a standard Web browser. The consumer may directly access a business place Web site, associated with a particular business place (e.g., the town of Wellesley, Mass.) to find providers in that business place. Additionally, the consumer may broaden the search to include other business places or migrate to other business places. As a function of the user's search, the collaborative linking system generates and displays within the CUI provider information and data, and may additionally provide information about companion providers or promotions. For example, if a consumer searches for pizza places in Wellesley, Mass., the CUI may provide a list of all pizza places in that town. Additionally, the user interface may provide indications of specials or promotions offered by certain providers (e.g., icons, conspicuous text, and/or sound messages). Also, as a function of the consumer's search, companion specials or promotions may also be included within the CUI, for example, a promotion by a local convenience store on soft drinks. Additionally, provider specials and promotions may provide virtual links to the provider's own Internet pages.

Additionally, a consumer's interests or other consumer information may be registered with the collaborative linking system. In such a case, a consumer may be linked (or matched) with providers as part of an "opt-in" service, as a function of a synergy between the consumer and the providers. For example, the consumer's interests may correspond to one or more provider's offers; consequently, the consumers and providers are linked by the collaborative linking system.

Preferably, the collaborative linking system maintains the anonymity of the consumer with respect to the provider when linking the two. Further aspects of this service may be better understood and appreciated in the context of the embodiment described in Appendix B herein.

As will be appreciated by those skilled in the art, the various UIs may vary, depending on the type of computer or electronic device with which they are to be used. For example, the CUI for a PC may differ from the CUI for a cell phone, and so on. Additionally, the various UIs may be defined in other manners without departing from the present invention.

The invention may be embodied in other specific forms without departing from the spirit or central characteristics thereof. For example, mapping of provider information may be dynamically accomplished and editable. Also, automated filters may be applied to effect the dynamic mapping of provider information. Additionally, third party databases may be linked into the collaborative linking system and used by providers to select consumers or by consumers to select providers. In other embodiments, the definition of the geographic regions may vary as a function of the product or service being searched, rather than be relatively statically defined. The present embodiments are therefore to be considered in all respects as illustrative and not restrictive, the scope of the invention being indicated by appending claims rather than by the foregoing description, and all changes that come within the meaning and range of equivalency of the claims are therefore intended to be embraced therein.

Appendix A

DESCRIPTION OF PROVIDER USER INTEFACE (PUI)

User Interface, Software Mechanism and Business Processes for Placing Business Directory & Promotional Information, for Place-specific data, and the means to search for it.

OUTLINE OF PUI (OR UI) SCREENS
(Cross referenced by number to other sections)

PUI provides an interface for providers to access the system for a variety of purposes. One possible set of functions and screens are described below, with one embodiment of UI screens shown.

1. Self-service UI for planning and placing "Yellow Pages style ads, and also promotional content.

1.0 Business Service interface 1.0.1 Welcome Back screen, invites providers to Login or Register as a New User.

1.0.1.1 Find and Select Listing screen, even if not registered can find your listing or proceed to register.

1.0.1.2 Registration screen, solicits information for provider to register with system 1.0.1.3 Response screen, if provider did not provide all required information in 1.0.1.2.

1.1. Search mechanism that sets up vendor/publisher relationship by permitting "binding" of one or more existing business listings or telephone listings to an owner buy means of a search and match process.

1.1.1. <u>Verification</u> that Online customer has ownership rights to publish 1.1.1.1.<u>Assurance for Verification</u> of identity above, by means of asking for credit card information, without charging a fee.

1.1.1.2.Any edits of main name, address, phone number, web address are verified by sending mailed postcard to former address, as well as to the new address and person named.

1.1.1.3.(Enhancement to present system) Listings already taken are searchable, but returned with indicator flag or message showing as "listing already registered " and is non-selectable, but with an e-mail-based system to dispute the ownership of the record.

1.1.2. <u>Binding together</u> of telephone listings by creating a new data element named Store Name / Store Group Name (currently named Location I.D) so as to re-establish data relationships when using telephone data being assembled back into business store listings with one or many telephone numbers and subsidiary telephone numbers.
    Example
    raw data
    Jeff's garage - service    781 235 1111
    Jeff's garage new car sales    781 235 2222 is re-grouped by means of a user-entered name as

Jeff's Garage
service           781 235 1111
new car sales     781 235 2222

1.1.2.1. Implemented by a combination of keyword search and point+click association 1.2. Order form for taking data for placing a YP-style ad online. Yellow Pages (Store-oriented Business Directory) style publishing system in an Internet-based UI, 1.2.1. The <u>ability to select</u> from a group of stores, <u>any combination</u>, one or <u>all</u> of the phone / store listings being managed, to be acted on in the shopping cart.

1.2.2. Order form SKUs, organized by <u>decomposed by data type</u> instead of by offer/graphical format.
Typically offline and online services propose a layout format with multiple sizes. PlaceLinks subsets the design by fielded data elements and charges by that format of skus; e.g.
Business Categories
Keywords
Realnames
Publish in many places.

1.3. Interface for Editing and/or Creating a Listing. providing online publishing options for a Yellow Pages (Store-oriented Business Directory) style publishing system in an Internet-based UI 1.3.1. Giving possibility of setting Time of day, Audience age, Audience gender, Content Ratings (Adult/All), 1.3.2. The above for both editing acquired listings and creating new ones 1.3.3. Organizing <u>original</u> Yellow Page <u>headings</u> (from original data) distinct from <u>designed category headings</u>, serving the same purpose, but designed as a separate taxonomy, plus meshing of same with <u>relationships</u>; so as to allow:

1.3.3.1. flexible acceptance of new data sources while protecting the integrity of the "house" category style"

1.3.3.2. permits use of parallel system of industrial classification; e.g. new and old SIC categories, NAICs codes and similar, reducing the disruption caused by changes in such systems.

1.3.3.2.1. Presented as a pop-up window (today), alphabetical listing (future), keyword search on categories and synonyms (future)

1.4. Order form for accepting keywords which may be typed to permit very rich shopping search opportunities 1.4.1. Mimicking the web search engines ability to find text in a document, but not using HTML structures, but employing fielded data associated with the advertisement 1.4.1.1. Which may or may not be rendered (may not = "hidden" data typing)

1.4.2. Data is typed as:    with examples:
        brand              Reebok, Chevrolet
        product            automobile, truck, oranges, movie
        service            plumbing, legal services, hairdressing, movies
        activity           sailing, swimming, movie-going 1.4.2.1. Typing presented through a pop-up window 1.4.3. Subsidiary typing is permitted
keyword=Chevrolet, type brand, formatting=hidden, [Present structure keeps hidden as a separate typing parallel to the other types)

1.4.4. Cross-linking relationships are permitted to allow creating flexible Bill-of-Materials and ordering structures, so that PlaceLinks may build online ordering systems in the future around SKUs; e.g.
SKU= xxxx,
Brand=
Product Descriptor=
Size= (typical of garments, grocery)
Style= (typical of garments)
Universal Product Code=

1.4.4.1. Relationships implemented via XML to take advantage of the unique relational and storage capabilities of that language 1.5. Transforming a URL locator system into a mechanism for relating content stored under that locator to place-specific commercial relationships:

1.5.1. PlaceLinks has taken the RealNames locator service and database, and provided a way to merchandise and "sell" it on a place-specific basis : A link is established from the store owner's local listing to the (typically) national scale web site of a RealNames licensee.

1.5.1.1. Implemented by a search, review, click-select dialog 1.6. Online UI for Customer Advertisers to describe a limited time promotion (a.k.a. Special)

1.6.1. for publication in a place-specific Internet advertising medium 1.6.2. permitting publishing options (as in 1.3.1)

1.6.3. permitting keyword entry to enhance ability to do specific searches for promotions (see 1.4)

1.6.4. and also permitting additional categories for describing the field of commerce 1.6.5. and also permitting "associate with" categories (in future "product" as well as categories) as an indication of when to advertise in the context of a different search type of product
e.g. - liquor stores specials advertised next to the pizza search, when the merchant has an expectation that one category will tend to be purchased with another.

1.6.6. Permitting UI setup via of several versions of the copy, for the purposes of copy-testing the versions, made possible because the traffic manager below 1.6.6.1. UI realized as parallel forms & randomization of delivery within all other publishing parameters 1.6.6.2. Hotlink to special version of traffic manager to filter out only those results needed to evaluate the copy choices (future)

1.6.7. Security enhancement - any promotion entered within a (reasonable postal delay cycle) days of the first registration will also be mailed along with the registration notice, or in addition to it.

1.7. Online UI for placing advertised listings in a random selection of places 1.7.1. Competitors typically do by geographical radius from store (e.g. Switchboard, I think)

1.7.2. This method described as selecting a "mosaic"

1.7.2.1. Presently implemented by searching for a place name and picking from a list 1.7.2.2. Future implementations may use:

1.7.2.2.1. economic value against merchant's advertising targeting criteria 1.7.2.2.2. an area map for visualization 1.7.2.2.3. 3D maps to show economic value against merchant's advertising targeting criteria 1.7.2.2.4. synonym tables for search when the name in question is not used as a region of publication
example:
Beacon Hill, = part of place area = Boston
Southboro = synonym for = Southborough
Windy City = synonym for = Chicago
Twin Cities = synonym for = Minneapolis / St. Paul 1.8. Traffic Manager to integrate all measurable data types with presentation of level of advertising impressions due to the keywords etc. chosen.

1.8.1. Presenting data by totals and sub-totals and totals for individual data elements, within store location format

MIGRATION THROUGH SOME OF THE UI SCREENS:
Provider User Interface (PUI)

The Welcome Back! Screen, shown immediately below, was reached by typing in the www address, "bs1.placelinks.net." That screen is the basis of all following access to the business system and the provider user interface (PUI).

Welcome Back! (PUI)
    Login to Business Service
    Order Form (#01) (section 1.2.2) (PUI)
        View Consumer Activity
            Traffic Monitor (section 1.8.1) (PUI)
                Order Form [returns to Order Form (#01)]
                Logout []
        Edit Business Listing
            Listing Manager (PUI)
                Find [Fill in the form.]
                Order Form [returns to Order Form (#01)]
                Shopping Cart
                    Shopping Cart (PUI)
                        Complete Transaction
                            Checkout (PUI)
                                Complete Transaction []
                                Order Form [returns to Order Form (#01)]
                                Logout
                                      Response: Thank you for visiting PlaceLinks (PUI)

Login [returns to Welcome Back! screen]
    Find / Create Business Listing
        Add New Listing   (PUI)
            Add Listing [adds listing and then returns to Order Form (#01)]
            Order Form [returns to Order Form (#01)]
            Checkout
        Shopping Cart   (PUI)
            Complete Transaction
            Checkout   (PUI)
                Complete Transaction [ processes transaction and returns control to Welcome Back! Screen]
                Order Form [same response as described above]
                Shopping Cart [returns control to Welcome Back! screen]
                Logout [same response as described above for logout]
    Add / Remove Categories
        Category Manager: Find a Category (section 1.3.3.2.1) (PUI)
            Find [ returns to Category Manager: Find a Category if none are found, else goes to Category Manager (#02) below]
            Category Manager: Matches Found (display augmented with found categories)
                Add Selections
                    Category Manager (#03) [display augmented with selected categories]
                        Add to Cart [adds to cart and then returns control to Order Form (#01)]
                        Find [maintains selected categories, then acts like Category Manager: Find a Category above]
                        Order Form []
                        Check Out []
                        Find []
                        Order Form []
                        Check Out
                            Shopping Cart: Your Shopping Cart is Empty (PUI)
                        Order Form [returns control to Order Form (#01) screen]
                        Logout
                            Response: Thanks for your visiting PlaceLinks

Login [returns control to Welcome Back! screen]
    Shopping Cart:  (your cart is not empty)
        Order Form [discards any input and returns to Order Form screen]
        Check Out
            Shopping Card   (PUI)
                Complete Transaction
                Checkout   (PUI)
                    Complete Transaction
                        Response: Your Credit Card has been Charged Successfully
Login Again [returns control to Welcome Back!]
    Order Form [returns control to Welcome Back screen]
    Logout [returns control to Welcome Back screen]
    Add / Remove Keywords
        Keyword Manager: Enter New Keyword   (PUI)

Add New [new keyword displayed]
              Keyword Manager: Selected Keywords (PUI)
                  Add to Cart [keyword added, control returned to Order Form (#01) screen]
                  Add New []
                  Order Form []
                  Check Out []
            Order Form []
           Check Out []
        Link to Manufacturer's Web Page

Realnames Manager (section 1.5.1) (PUI)
        example [button]
        click here [button leads to URL]
        Consumer View [button]
        Delete [carries out action and returns control to updated Realnames Manager screen]
        Find []
        Realnames Manager (section 1.5.1) after response (PUI)
            Order Form []
            Check Out []

Edit / Create Promotions
    Promotions Manager (PUI)
        Consumer View []
        Delete []
        Update []
        Add Categories []
        Create New Promotion []
        Order Form []
Publish Listing in many Places []
Checkout []
Profile []
Logout []
Back [returns control to Welcome Back! screen]

Forgotten Password?
    Forgot Password? (PUI)
        Send Password Now
            Response: Password has been sent to your e-mail address. (PUI)

Login [returns control to Welcome Back! screen] (Section 1.0.1)
    I am a new user Register me now! (Section 1.0.1)
        Find and Select Listings (section 1.0.1.1 & 1.2.1) (PUI)
            Find []
I am a new Business Owner. Create New Listing after Registration (Section 1.0.1.1)
    Continue with Registration
        Register [complete fields] (Section 1.0.1.2)
            Register Now
                Response [Required Fields are Missing] (Section 1.0.1.4)
                Back

PLACELINKS — Main Menu

Design your listings here

Ad Manager
Edit Content
Main Menu
- Listings
- Categories
- Keywords
- Link Sites
- Promotions
- Publish Listing
- Network Directories
- Activity
- Shopping Cart
- Logout

References
- Edit Profile
- Prices
- Terms
- Help

Select listing you want to edit

Select one or more listing(s) and then choose an action from the Action menu, below.

| Pick | Headline of Listing | | New Listing |
|---|---|---|---|
| ☐ | Andover Airport Shuttle | Preview | Delete |
| ☐ | Costal Seafoods | Preview | Delete |
| ☐ | Domino's Pizza - Wellesley | Preview | Delete |
| ☐ | Fenn, Thomas O., Law Offices of | Preview | Delete |
| ☐ | Lisa's Law Office | Preview | Delete |
| ☐ | Marthas Vineyard Times | Preview | Delete |
| ☐ | Massachusetts Office of Travel & Tourism | Preview | Delete |
| ☐ | New England Dental Group | Preview | Delete |
| ☐ | Petters Warehouse Direct | Preview | Delete *(Delete this dire)* |
| ☐ | Prospeed Net Inc. | Preview | Delete |
| ☐ | Ryder Truck Rental in Needham | Preview | Delete |
| ☐ | Winston Flowers | Preview | Delete |
| ☐ | WorldCom Sales | Preview | Delete |
| ☐ Select All | | | |

Pricing Quick Reference

Choose action to manage listings here, or on menu at left.
Actions apply to all listings selected in the Select Listings, above.

| Action | Description | Help |
|---|---|---|
| Add Categories | List business in one or more categories | ? |
| Add Keywords | 25 FREE - brands, products and services you offer | ? |
| Link to Websites | Link to great partner websites | ? |
| Promotions Builder | Up to seven FREE days for each promotion | ? |
| Publish Listing | Add towns and cities - increase the reach of your listing | ? |
| Activity Log | See traffic - FREE to registered business users | ? |
| Extended Syndication | Extended Syndication | ? |

Go Shopping | About PlaceLinks | Terms of Service | Your Feedback | Privacy Policy | Help
Advertise Here | Technology & Products Copyright (c) PlaceLinks Inc. 1999-2001. All Rights Reserved.

PLACELINKS — Edit Listing

Correct the business name, add captions and Web address here

Ad Manager
Edit Content
- Main Menu
- Listings
- Categories
- Keywords
- Link Sites
- Promotions
- Publish Listing
- Network Directories
- Activity
- Shopping Cart
- Logout

References
- Edit Profile
- Prices
- Terms
- Help

Business Listing

| Field | Value | Notes |
|---|---|---|
| Business Listing* | Andover Airport Shuttle | This should be your business name. *=required field. |
| Caption #1 | Fast and Reliable | Caption 1 through Caption 6 can contain advertising statements or information useful to your consumers, e.g. "Toll Free Number" or "Sales Department". |
| Caption #2 | | |
| Caption #3 | | |
| Caption #4 | | |
| Caption #5 | | |
| Caption #6 | | |
| Street Number | 19 | |
| Street Directional | | |
| Street Name | Barnard St | |
| Unit Designator | | |
| Apartment Number | | |
| City* | Andover | |
| State Code* | MA | |
| Zip Code +4* | 01810 - 3601 | |
| Phone* | (978) 470-3311 | e.g. (781) 235-1313 |
| Web Address | http://www.shuttle.com | |

[ Leave without Updating ]  [ Update Listing ]

---

Go Shopping | About PlaceLinks | Terms of Service | Your Feedback | Privacy Policy | Help
Advertise Here | Technology & Products Copyright (c) PlaceLinks Inc. 1999-2001. All Rights Reserved.
PlaceLinks.com and the PlaceLinks logo are trademarks of PlaceLinks Inc.

PLACELINKS  Add Keywords

Define Goods and Services Keywords for Searching here

Ad Manager

Edit Content
Main Menu
Listings
Categories
Keywords
Link Sites
Promotions
Publish Listing
Network Directories
Activity
Shopping Cart
Logout

References
Edit Profile
Prices
Terms
Help

Current keywords

Existing keywords are listed below.

| Store Location | Keyword | Type | Delete |
|---|---|---|---|
| Costal Seafoods | Oysters | Product | Delete |
| Costal Seafoods | Ahi | Product | Delete |
| Costal Seafoods | Lobster | Product | Delete |
| Costal Seafoods | Opah | Product | Delete |
| Costal Seafoods | Tuna | Product | Delete |
| Costal Seafoods | Grouper | Product | Delete |
| Costal Seafoods | Shrimp | Product | Delete |
| Costal Seafoods | Clams | Product | Delete |
| Costal Seafoods | Crab | Product | Delete |
| Costal Seafoods | Party Trays | Product | Delete |
| Costal Seafoods | Red Snapper | Product | Delete |
| Costal Seafoods | Scallops | Product | Delete |
| Costal Seafoods | Mussels | Product | Delete |
| Costal Seafoods | Sea Bass | Product | Delete |
| Costal Seafoods | Prepared Foods | Service | Delete |
| Costal Seafoods | Halibut | Product | Delete |
| Costal Seafoods | Salmon | Product | Delete |
| Costal Seafoods | Cooking Classes | Service | Delete |
| Costal Seafoods | Walleye | Product | Delete |

New keywords in shopping cart

New keywords entered during this session are listed below. Setup fees will apply unless deleted.
None

Add additional keywords

Enter a word or phrase to describe your business' products, services, brands and activities. Visible to users. Case will be preserved.

Select type of keyword. Use hidden if you want the keyword searchable but not shown in your listing.

Text String (case matters)  Type

[                    ]  [Service ▼]

[ Create & Add to Cart ]

[ Recommend Some Keywords ]

Recommended keywords, select to add to cart

PLACELINKS Create Promotion

Author promotional messages which drive clicks to your business

Ad Manager
Edit Content
  Main Menu
  Listings
  Categories
  Keywords
  Link Sites
  Promotions
  Publish Listing
  Network Directories
  Activity
  Shopping Cart
  Logout

References
  Edit Profile
  Prices
  Terms
  Help

Promotional Text

This section defines the promotion's visible content elements. Enter clear text only - no HTML. These entry fields are very close to the actual size (150 wide by 5 lines). If you use both body and disclaimer text limit the total to approximately 6 lines. When you are done you can preview a WYSIWYG version and edit the text to refine your promotion. See sample promotion.

Title*: Fresh Seafood Specials

Offer Text*:
mahi - fillets $6.99 / lb.
tilapia - fillets $6.99 / lb.

Disclaimer: As updated on our Web site (every Thursday)

Consumer Terms

| | Offer Starts | Offer Ends |
|---|---|---|
| | 2/15/2001 | 3/15/2001 |

Link

| Label | Weekly Specials |
|---|---|
| URL | http://www.coastalseafoods.co[ |

Publishing Options

This section defines who can see the promotion and when it runs during the day and month. All promotions are fixed in time and expire on the end date.

| | On-line | Off-line |
|---|---|---|
| Visible Dates | 2/15/2001 | 3/15/2001 |

Promotional Categories

Choose two categories where you want this promotion visible. These may be different from those chosen for the Store Location.

| | Find | Category Name |
|---|---|---|
| Category 1 | Category | Fish and Seafood Markets |
| Category 2 | Category | Grocery Stores |

Page 2

Prices
Terms
Help

Consumer Terms

| Offer Starts | Offer Ends |
|---|---|
| 2/15/2001 | 3/15/2001 |

Link

| Label | Weekly Specials |
|---|---|
| URL | http://www.coastalseafoods.co| |

Publishing Options

This section defines who can see the promotion and when it runs during the day and month. All promotions are fixed in time and expire on the end date.

| | On-line | Off-line |
|---|---|---|
| Visible Dates | 2/15/2001 | 3/15/2001 |

Promotional Categories

Choose two categories where you want this promotion visible. These may be different from those chosen for the Store Location.

| | Find | Category Name |
|---|---|---|
| Category 1 | Category | Fish and Seafood Markets |
| Category 2 | Category | Grocery Stores |

Promotional Keywords

Enter five keywords which describe this promotion.

| | Keyword Text | Keyword Type |
|---|---|---|
| Keyword #1 | Fish Fillets | Hidden |
| Keyword #2 | Mahi | Hidden |
| Keyword #3 | Tilapia | Hidden |
| Keyword #4 | | Service |
| Keyword #5 | | Service |

Save & Add to Cart

---

Go Shopping | About PlaceLinks | Terms of Service | Your Feedback | Privacy Policy | Help
Advertise Here | Technology & Products Copyright (c) PlaceLinks Inc. 1999-2001. All Rights Reserved.
PlaceLinks.com and the PlaceLinks logo are trademarks of PlaceLinks Inc.

CYBERCASH  TRUSTe  VeriSign

Popup

Search Categories

Enter words in category name.

Chose consumer or business categories.

Search Category Names  Commerce Segment

[                              ]  ◉ Consumer
                                   ○ Business  ○ All

[ Search for Categories ]

Categories Found

Choose Category                                                Segment

Matches Found: 13

| | | |
|---|---|---|
| ☐ | American Restaurants, Soul Food | B2C |
| ☐ | Community Food and Housing, and Emergency and Other Relief Services | B2C |
| ☐ | Community Food Services | B2C |
| ☐ | Fast Food | B2C |
| ☐ | Fish and Seafood Markets | B2C |
| ☐ | Food and Drink | B2C |
| ☐ | Food Service Contractors | B2C |
| ☐ | Health Food Stores | B2C |

PLACELINKS — Activity Log

View how consumers are finding your listing(s)

Ad Manager
Edit Content
Main Menu
Listings
Categories
Keywords
Link Sites
Promotions
Publish Listing
Network Directories
Activity
Shopping Cart
Logout

References
Edit Profile
Prices
Terms
Help

Costal Seafoods
02/15/2001    Start: 11/15/2000    End: 02/15/2001

Where Found Report

| Impression Count | Place Service | Consumer View |
|---|---|---|
| 106 | All Places | Preview |
|  | 106 MetroWest | Actual |

How Found Report

| Impression Count | Search Method |
|---|---|
| 21 | All Searches |
| 7 | Text Searches |
|  | 2 lobster |
|  | 1 seafood |
|  | 1 tuna |
|  | 1 shrimp |
|  | 1 fish |
|  | 1 classes |
| 9 | Category Searches |
|  | 3 Fish and Seafood Markets |
|  | 3 Specialty Food Stores |
|  | 3 Grocery Stores |
| 1 | Product Searches |
|  | 1 Opah |
| 4 | Street Searches |
|  | 4 Minnehaha Ave |

What Action Report

| Impression Count | User Action |
|---|---|
| 85 | All Actions |
|  | 67 Promotions |
|  | 18 Listing Views |

Go Shopping | About PlaceLinks | Terms of Service | Your Feedback | Privacy Policy | Help
Advertise Here | Technology & Products Copyright (c) PlaceLinks Inc. 1999-2001. All Rights Reserved.
PlaceLinks.com and the PlaceLinks logo are trademarks of PlaceLinks Inc.

PLACELINKS Shopping Cart

View the listing services you have requested here

Ad Manager
Edit Content
  Main Menu
  Listings
  Categories
  Keywords
  Link Sites
  Promotions
  Publish Listing
  Network Directories
  Activity
  Shopping Cart
  Logout

References
  Edit Profile
  Prices
  Terms
  Help

Order Summary

Date Today: 2/15/2001

| | |
|---|---|
| Total setup fees due now - all stores | $0.00 |
| Total recurring fees due now - all stores | $626.60 |
| Total price of this order | $626.60 |
| Credit/Debit from prior transactions | ($626.60) |
| | This amount represents the unused/unpaid portion of your prior transaction. Credit amount is limited to the total price of this order. Debit amounts are limited to fractional dollar amounts. Learn more about Our Credit Policy. |
| Total new charges due now | $0.00 |
| Logout | You have no changes. |

For your records

| | |
|---|---|
| Next billing date | 3/13/2001 |
| Estimated monthly charge | $674.80 |
| Credit available from prior payments after this payment | ($175.98) |

This estimate is based on the current order status, shown above, and the list prices in effect today. Changes to this estimate may occur if you modify your order or the price list changes. We reserve the right to change its prices at any time. Learn more about Our pricing policy.

Andover Airport Shuttle - store320

| | Order Status | Setup Fees | | | | Recurring Fees | | | |
|---|---|---|---|---|---|---|---|---|---|
| Item Description | New Qty. | List Price | % Disc. | Ext. Price | Tot. Qty. | Units Free | Net Qty. | List Price | % Disc. | Ext. Price |
| Listings | 0 | $0.00 | 0.00% | $0.00 | 1 | 0 | 1 | $0.00 | 0.00% | $0.00 |
| Categories | 0 | $0.00 | 0.00% | $0.00 | 40 | 1 | 39 | $10.00 | 50.00% | $195.00 |
| Keywords | 0 | $0.00 | 0.00% | $0.00 | 1 | 25 | 0 | $0.50 | 50.00% | $0.00 |
| RealName Links | 0 | $0.00 | 0.00% | $0.00 | 1 | 0 | 1 | $2.00 | 50.00% | $1.00 |
| Days of Promotion | 0 | $0.00 | 0.00% | $0.00 | 0 | 7 | 0 | $0.25 | 50.00% | $0.00 |
| Places | | | | | | | | | | |

Page 2

| Item Description | New Qty. | List Price | % Disc. | Ext. Price | Tot. Qty. | Units Free | Net Qty. | List Price | % Disc. | Ext. Price |
|---|---|---|---|---|---|---|---|---|---|---|
| RealName Links | 0 | $0.00 | 0.00% | $0.00 | 1 | 0 | 1 | $2.00 | 50.00% | $1.00 |
| Days of Promotion | 0 | $0.00 | 0.00% | $0.00 | 0 | 7 | 0 | $0.25 | 50.00% | $0.00 |
| Places Published | 0 | $0.00 | 0.00% | $0.00 | 11 | 1 | 10 | $4.44 | 50.00% | $22.21 |

Boston Phoenix – Ad Placement Fees

| Item Description | New Qty. | List Price | % Disc. | Ext. Price | Tot. Qty. | Units Free | Net Qty. | List Price | % Disc. | Ext. Price |
|---|---|---|---|---|---|---|---|---|---|---|
| Extended Network Placement | 0 | $0.00 | 0.00% | 0.00 | 1 | 0 | 1 | $25.00 | 0.00% | $25.00 |

| Setup fee for these changes | $0.00 | Total recurring monthly fees | $243.21 |
|---|---|---|---|
| | | Recurring fees due now | $225.83 |

Costal Seafoods – store2474

Order Status   Setup Fees   Recurring Fees

| Item Description | New Qty. | List Price | % Disc. | Ext. Price | Tot. Qty. | Units Free | Net Qty. | List Price | % Disc. | Ext. Price |
|---|---|---|---|---|---|---|---|---|---|---|
| Listings | 0 | $0.00 | 0.00% | $0.00 | 1 | 0 | 1 | $0.00 | 0.00% | $0.00 |
| Categories | 0 | $0.00 | 0.00% | $0.00 | 4 | 1 | 3 | $10.00 | 50.00% | $15.00 |
| Keywords | 0 | $0.00 | 0.00% | $0.00 | 19 | 25 | 0 | $0.50 | 50.00% | $0.00 |
| RealName Links | 0 | $0.00 | 0.00% | $0.00 | 0 | 0 | 0 | $2.00 | 50.00% | $0.00 |
| Days of Promotion | 0 | $0.00 | 0.00% | $0.00 | 42 | 7 | 35 | $0.25 | 50.00% | $4.38 |
| Places Published | 0 | $0.00 | 0.00% | $0.00 | 1 | 1 | 0 | $0.00 | 50.00% | $0.00 |

| Setup fee for these changes | $0.00 | Total recurring monthly fees | $19.38 |
|---|---|---|---|
| | | Recurring fees due now | $18.00 |

Domino's Pizza – Wellesley – store2103

Order Status   Setup Fees   Recurring Fees

| Item Description | New Qty. | List Price | % Disc. | Ext. Price | Tot. Qty. | Units Free | Net Qty. | List Price | % Disc. | Ext. Price |
|---|---|---|---|---|---|---|---|---|---|---|
| Listings | 0 | $0.00 | 0.00% | $0.00 | 1 | 0 | 1 | $0.00 | 0.00% | $0.00 |
| Categories | 0 | $0.00 | 0.00% | $0.00 | 3 | 1 | 2 | $10.00 | 50.00% | $10.00 |
| Keywords | 0 | $0.00 | 0.00% | $0.00 | 7 | 25 | 0 | $0.50 | 50.00% | $0.00 |
| RealName Links | 0 | $0.00 | 0.00% | $0.00 | 0 | 0 | 0 | $2.00 | 50.00% | $0.00 |
| Days of Promotion | 0 | $0.00 | 0.00% | $0.00 | 0 | 7 | 0 | $0.25 | 50.00% | $0.00 |
| Places Published | 0 | $0.00 | 0.00% | $0.00 | 10 | 1 | 9 | $4.65 | 50.00% | $20.93 |

| Setup fee for these changes | $0.00 | Total recurring monthly fees | $30.93 |
|---|---|---|---|
| | | Recurring fees due now | $28.72 |

Fenn, Thomas O., Law Offices of – store321

Page 3

| | | | | | | | | | |
|---|---|---|---|---|---|---|---|---|---|
| Places Published | 0 | $0.00 | 0.00% | $0.00 | 10 | 1 | 9 | $4.65 50.00% | $20.93 |
| Setup fee for these changes | | | | $0.00 | Total recurring monthly fees | | | | $30.93 |
| | | | | | Recurring fees due now | | | | $28.72 |

Fenn, Thomas O., Law Offices of - store321

| Order Status | Setup Fees | | | | | | | Recurring Fees | |
|---|---|---|---|---|---|---|---|---|---|
| Item Description | New Qty. | List Price | % Disc. | Ext. Price | Tot. Qty. | Units Free | Net Qty. | List Price % Disc. | Ext. Price |
| Listings | 0 | $0.00 | 0.00% | $0.00 | 1 | 0 | 1 | $0.00 0.00% | $0.00 |
| Categories | 0 | $0.00 | 0.00% | $0.00 | 6 | 1 | 5 | $10.00 50.00% | $25.00 |
| Keywords | 0 | $0.00 | 0.00% | $0.00 | 15 | 25 | 0 | $0.50 50.00% | $0.00 |
| RealName Links | 0 | $0.00 | 0.00% | $0.00 | 2 | 0 | 2 | $2.00 50.00% | $2.00 |
| Days of Promotion | 0 | $0.00 | 0.00% | $0.00 | 0 | 7 | 0 | $0.25 50.00% | $0.00 |
| Places Published | 0 | $0.00 | 0.00% | $0.00 | 13 | 1 | 12 | $7.14 50.00% | $42.86 |

Boston Phoenix - Ad Placement Fees

| | | | | | | | | | |
|---|---|---|---|---|---|---|---|---|---|
| Extended Network Placement | 0 | $0.00 | 0.00% | 0.00 | 1 | 0 | 1 | $25.00 0.00% | $25.00 |
| Setup fee for these changes | | | | $0.00 | Total recurring monthly fees | | | | $94.86 |
| | | | | | Recurring fees due now | | | | $88.08 |

Lisa's Law Office - store2462

| Order Status | Setup Fees | | | | | | | Recurring Fees | |
|---|---|---|---|---|---|---|---|---|---|
| Item Description | New Qty. | List Price | % Disc. | Ext. Price | Tot. Qty. | Units Free | Net Qty. | List Price % Disc. | Ext. Price |
| Listings | 0 | $0.00 | 0.00% | $0.00 | 1 | 0 | 1 | $0.00 0.00% | $0.00 |
| Categories | 0 | $0.00 | 0.00% | $0.00 | 0 | 1 | 0 | $10.00 50.00% | $0.00 |
| Keywords | 0 | $0.00 | 0.00% | $0.00 | 0 | 25 | 0 | $0.50 50.00% | $0.00 |
| RealName Links | 0 | $0.00 | 0.00% | $0.00 | 0 | 0 | 0 | $2.00 50.00% | $0.00 |
| Days of Promotion | 0 | $0.00 | 0.00% | $0.00 | 21 | 7 | 14 | $0.25 50.00% | $1.75 |
| Places Published | 0 | $0.00 | 0.00% | $0.00 | 0 | 1 | 0 | $0.00 50.00% | $0.00 |
| Setup fee for these changes | | | | $0.00 | Total recurring monthly fees | | | | $1.75 |
| | | | | | Recurring fees due now | | | | $1.63 |

Marthas Vineyard Times - store2027

| Order Status | Setup Fees | | | | | | | Recurring Fees | |
|---|---|---|---|---|---|---|---|---|---|
| Item Description | New Qty. | List Price | % Disc. | Ext. Price | Tot. Qty. | Units Free | Net Qty. | List Price % Disc. | Ext. Price |
| Listings | 0 | $0.00 | 0.00% | $0.00 | 1 | 0 | 1 | $0.00 0.00% | $0.00 |

PLACELINKS

Your Profile

Edit your profile here

Ad Manager
Edit Content
Main Menu
Listings
Categories
Keywords
Link Sites
Promotions
Publish Listing
Network Directories
Activity
Shopping Cart
Logout

References
Edit Profile
Prices
Terms
Help

Personal Information

Please note * denotes a required field.

| | |
|---|---|
| First Name* | Jonathan |
| Last Name* | Bachman |
| Title | EVP Sales |

Select Username and Password

Pick a user name and password. Minimum 6 characters required for user name and password. No spaces please. We will confirm this to you by email.

| | | |
|---|---|---|
| User Id* | doverma | |
| Password* | ******** | (Min 6 characters) |
| Verify Password* | ******** | (Min 6 characters) |

Billing Address

For security, some of your actions online are confirmed by US mail. Where do we send this mail? It can be your home or business address, whichever you prefer.

| | |
|---|---|
| Name of Company | PlaceLinks Inc. |
| Street Address (Line 1)* | 868 Worcester Street |
| Street Address (Line 2) | Suite 2 |
| City* | Wellelsey |
| State* | MA |
| Zip Code* | 02462 |
| Country | USA |
| No. of Employees* | 12 |

Billing Contact Information

| | |
|---|---|
| Daytime Phone* | 781-235-1313 |
| Fax | 781-235-5566 |
| E-Mail Address* | jbachman@placelinks.com |
| Web Site | http://www.placelinks.com |

Billing Credit Card

To complete your registration, we require your credit card information to verify identity and the

PLACELINKS

Price Policy

Fee Structure for PlaceLinks Advertising Services

Ad Manager
Edit Content
Main Menu
Listings
Categories
Keywords
Link Sites
Promotions
Publish Listing
Network Directories
Activity
Shopping Cart
Logout

References
Edit Profile
Prices
Terms
Help

Advertising Service Price List

Prices are subject to change daily in response to market conditions. The price for publishing listings and promotions will change over time in response to market conditions and enhancements of service.

A "place" in these descriptions is typically a town or city neighborhood, as defined by PlaceLinks.

Keywords Pricing
Unit = one keyword attached to one listing for one month in one place

| Setup Fees | | | Recurring Fees | |
|---|---|---|---|---|
| Unit Price | % Disc. | Units Free | List Price | % Disc |
| FREE | n/a | 25 | $0.50 | 50.00 |

Category Pricing
Unit = one category attached to one listing for one month in one place

| Setup Fees | | | Recurring Fees | |
|---|---|---|---|---|
| Unit Price | % Disc. | Units Free | List Price | % Disc |
| FREE | n/a | 1 | $10.00 | 50.00 |

RealName Pricing
Unit = one RealName link attached to one listing for one month in one place

| Setup Fees | | | Recurring Fees | |
|---|---|---|---|---|
| Unit Price | % Disc. | Units Free | List Price | % Disc |
| FREE | n/a | none | $2.00 | 50.00 |

Promotion Pricing
Unit = one Promotion caption published for one listing for one day in one place

| Setup Fees | | | Recurring Fees | |
|---|---|---|---|---|
| Unit Price | % Disc. | Units Free | List Price | % Disc |
| FREE | n/a | 7 | $0.25 | 50.00 |

Publishing Pricing (nominal) — Place Prices

Unit = one listing and all its added enhancements published in one place for one month. Due to the varying size of towns and city neighborhoods, as measured by population and household, the actual publishing price is scaled by a size factor and can therefore vary from the numbers shown below.

Note: The Unit Price for Publishing shown in the checkout page is a weighted average of publishing prices for all the places you have selected for that listing. If you change the list of places this weighted average price will change.

| Setup Fees | | Recurring Fees | | |
|---|---|---|---|---|
| Unit Price for nominal-size place* | % Disc. | Units Free | List Price | % Disc |

PLACELINKS Free Registration

Welcome - Business Owners and Store Managers

3 Easy Steps

Step 1: Find your business listing.
Step 2: Enhance your listing by adding information about the services, products and brands you offer.
Step 3: Provide information about you.

Step 1
Find your business listing, similar to this...

Business Listing
Noodle Kidoodle,
Sherwood Plaza      Map and Directions.
Natick, MA 01760
Phone: (508) 650-6244

Enter the information below to find your current listing

- Business Phone Number: [ ]
- Business Name: [ ]
- City: [ ]
- State Code: [MA ▼]
- Zip code: [ ]

[Find my listing] This button will search for your listing in our base data, based on the values you have entered above.

[Create new listing] If your business is new, it might not be listed in our base data. This button will take you to a registration page where you can specify all your business information from scratch. If you're unsure which button to select, try to find your listing in our database first.

---

Go Shopping | About PlaceLinks | Terms of Service | Your Feedback | Privacy Policy | Help
Advertise Here | Technology & Products

PLACELINKS Business Information

Enter Business Information Here

Step 2a
Enhance your listing by adding information about the services, products and brands you offer. See Example Listing

Enter or correct your business name and verify the address (published)

The following is your business directory entry. Please verify the information is correct and add any information which is missing. * Indicates required fields

| | | |
|---|---|---|
| *Business Name | Dominos Pizza | searchable text |
| Tagline | Weston Road & Rte 9 Intersection | searchable text / optional |
| | Example: "In Business Since 1910". | |
| *Phone Number | (781) 235-0020 | |
| Phone Caption | | searchable text / optional |
| | For example, "Toll Free" to indicate a 1-800 number and "24 Hours" to indicate always open. | |
| Street Number | 868 | |
| Street Name | Worcester St | searchable text / navigational link |
| *City | Wellesley | |
| *State | MA | |
| *Zip Code + 4 | 02482 - 3707 | optional |

Note: After completing this form you can add multiple business phone numbers and locations using our Enhanced Services.

Enter your business Website (published link)

If your business has a web site and you would like it to appear with your listing, please enter the link here. Test this value in your browser before proceeding.

| | | |
|---|---|---|
| Web Site | http:// | optional / link to web site |

Select the best category for your listing (published)

Your free business listing includes ONE category only. Based on our data, we suggest this category. If this is not correct, or if none is shown, click the Choose Category button to select a category.

Page 2

Select the best category for your listing (published)

Your free business listing includes ONE category only. Based on our data, we suggest this category.
If this is not correct, or if none is shown, click the Choose Category button to select a category.

Category
```
Restaurants
```
searchable / navigational link

[ Choose Category ]

Note: After completing this form you can add multiple categories with our Enhanced Services.

Enter the brands, products and services your customers ask you about

The free listing includes 25 words that describe your business. Enter brands, products, services and activities that your customers might ask you about. Enter 25 in all four areas combined.

List of Brands
```
Domino's
```
For example: Sony, Revlon, Omaha Steak, Pirelli, Ford
Optional / full text searchable / field searchable

List of Products
```
Chicken Wings, Pizza
```
For example: Muffler, Soap, Diapers, Ham
Optional / full text searchable / field searchable

List of Services
```
Delivery
```
For example: Surveying, Carpentry, Cleaning
Optional / full text searchable / field searchable

List of Activities
```
Parties
```
For example: Sailing, Decorating, Cooking, Collecting
Optional / full text searchable / field searchable Note: After completing this form you can add additional keywords with our Enhanced Services.

Selected the city or town where you want to be listed

Choose the town or place where you want your listing to appear. The free registration includes ONE town.

Select town
```
Dover, MA
Natick, MA
Needham, MA
Newton, MA
Wellesley, MA
Weston, MA
```

PLACELINKS Preview Listing

This is what your listing now looks like

Step 2b
Preview your new listing the way consumers will see it.

Review this WYSIWYG mock-up (actual listing)

This is a WYSIWYG (what you see is what you get) mockup of your listing as consumers will find it. Consumers can find it by searching on your business name, captions and keywords you've entered on the previous page. Consumers can also find your listing by navigating the "Other Businesses on street name" link and the "Find us in Category ... category name".

<<<    600 PIXELS ACTUAL WIDTH    >>>

Links do not work in preview mode

Dominos Pizza

Business Name and Captions

Dominos Pizza
Weston Road & Rte 9 Intersection
phone: (781) 235-0020

Business Location

Address:
868 Worcester St
Wellesley, MA 02482

Street Search
Map and Directions

Our Offerings

Brands — Domino's
Products — Chicken Wings, Pizza
Services — Delivery
Activities — Parties Related Industries Category — Restaurants E-Mail toFriend — New Search

[ Go Back - Make Changes ]    [ Continue - Free Registration ]

---

Go Shopping | About PlaceLinks | Terms of Service | Your Feedback | Privacy Policy | Help
Advertise Here | Technology & Products Copyright (c) PlaceLinks Inc. 1999-2001. All Rights Reserved.

PLACELINKS Verification

Making sure the responsible person is making changes

Step 3c
Please choose the way we should verify that registration is authorized. Read the PlaceLinks Privacy Policy and Terms of Service

How we verify your listing update

We want to be sure the responsible person is changing your listing. There are two options to verify your changes — the first gets your new listing working right away.

- Use a credit card to verify - gets your listing online within hours or

- Confirm offline

Yes, please verify with my credit card, and get me online right away!

- Free Listing - no charges apply
- Your information is protected by our Privacy Policy

Which card should we use?

| Field | Value | |
|---|---|---|
| * Name on Card | Jonathan Bachman | required |
| | Exactly as it appears on your credit card | |
| * Credit Card Number | | required |
| * Payment Type | American Express | required |
| * Expiration Date | | required format (mm/yy) |
| * Billing Address | 668 Worcester St | required |
| * City | Wellesley | required |
| * State | MA | required |
| * Zip Code | 02482 | |

Page 2

- Confirm offline

Yes, please verify with my credit card, and get me online right away!

- Free Listing - no charges apply
- Your information is protected by our Privacy Policy

Which card should we use?

| | | |
|---|---|---|
| *Name on Card | Jonathan Bachman | required |
| | Exactly as it appears on your credit card | |
| *Credit Card Number | | required |
| *Payment Type | American Express ▼ | required |
| *Expiration Date | | required format (mm/yy) |
| *Billing Address | 868 Worcester St | required |
| *City | Wellesley | required |
| *State | MA | required |
| *Zip Code | 02482 | required (must be same as your billing zip code) |

IMPORTANT: Please click the "Submit Online Verification" button only once, then wait for your confirmation page to appear.

[ Submit Online Verification ]

Please verify offline

- Free Listing - no charges apply

Which number(s) should we try?

| | |
|---|---|
| *Day time phone | (781) 235-0020 |
| Evening phone | |

[ Save Registration Information ]

---

Go Shopping | About PlaceLinks | Terms of Service | Your Feedback | Privacy Policy | Help
Advertise Here | Technology & Products Copyright (c) PlaceLinks Inc. 1999-2001. All Rights Reserved.
PlaceLinks.com and the PlaceLinks logo are trademarks of PlaceLinks Inc.

CYBERCASH   TRUSTe   VeriSign

Appendix B

Summary

This is a requirements document for a "Local Shopper" service, complemented by a sample format, cut from the example spreadsheet, pl copy2.xls.

Anonymous Shopper (A-S) was the original name. PlaceLinks "Local Shopper" is the working name.

Objectives for document
- Describe a set of business objectives for the feature.
- Describe a features
- Describe a format.
- Describe a overview of surrounding business processes

Reference documents
The model references ...
- PlaceLinks consumer website, cs1.placelinks.net as of today
- PlaceLinks business website, bs1.placelinks.net as of today
- Description of objectives and design of our billing system, price model05.doc
- Detail listing structure
- Specials detail structure
- Draft UI in spreadsheet plcopy2.xls
- Descriptions of function in the billing system spec, pricemodel05.doc
- Requirements of the TRUSTe.org privacy branding, as well as complying with the Federal laws on soliciting minors in the COPPA legislation.
- Report on November 1999 consumer groups from Pathfinder research

Contents

PLACELINKS INC. .................................................................................................................. 46
Feature:   Local Shopper.......................................................... Error! Bookmark not defined.
        Change Summary............................................................. Error! Bookmark not defined.
        Summary .................................................................................................................... 46
        Objectives for document ............................................................................................ 46
        Reference documents ................................................................................................ 46
        Contents .................................................................................................................... 47
        Business Objectives .................................................................................................. 47
                What is Local Shopper? ................................................................................ 47
                Revenue reasons to build Local Shopper ...................................................... 48
                Expense reasons to build Local Shopper ...................................................... 48
        Pricing 48
        Feature Requirements ............................................................................................... 49
                Construct ...................................................................................................... 52
                Promote ........................................................................................................ 60
                Register Consumer ....................................................................................... 60
                Track Registration Response ........................................................................ 62
                Consumer Maintains .................................................................................... 62
                Match Supply and Demand........................................................................... 62
                Send E-mail .................................................................................................. 63
                Track Response ............................................................................................ 63
                Display Results ............................................................................................. 63
                PlaceLinks administrates Local Shopper ..................................................... 65
        Business Processes .................................................................................................... 65
        Data capture opportunities ........................................................................................ 65
        Patent Opportunities .................................................................................................. 65

Business Objectives

What is Local Shopper?
- Local Shopper is an opt-in consumer service for matching consumers' buying interests with suppliers' offers. It is implemented as opt-in email.
- Local Shopper operates for the consumer as a persistent news service for shopping. The consumer declares his / her interests in brands, products, services, stores, activities, reflected by the following kinds of sentiments:

| | |
|---|---|
| Brands | "I love to buy Donna Karan" |
| Products | "Find me a lawnmower" |
| Stores | "Starbucks is a daily stop for me". Store names may also be considered brands, of course. |
| Activities | "I love to go sailing and dancing" |

The Local Shopper consumer's personal profile is known only to PlaceLinks, not to the advertiser. The advertiser knows only the aggregate potential traffic data for the categories or keywords he buys.
Local Shopper allows consumers to receive emails, and gives them ways of responding.

The transaction is an email sent from the advertiser, via the PlaceLinks server, to the consumer, yielding an email impression, message impression, and maybe a click-through. These events can all be measured separately by the server, as a different level of result.

Anonymity is important because it encourages the disclosure of profile information, and therefore the use of the service.

The consumer groups we held showed the high value and importance of putting the Local Shopper substantially under the consumer's control. Consumers in our October focus groups spontaneously mentioned features like the following.

- Allow me to get emails on a subject with the frequency I like to set.
- Allow the editing of individual keywords as a direct response to an email, from an embedded URL in the email message.
  Example:
  This message sent in response to the keyword "Izod" in your PlaceLinks Local Shopper. Click here to
  * turn off this keyword
  * add an other keyword
  * change message frequency on this keyword
  * give PlaceLinks feedback on this offer There are both Revenue and Expense reasons to develop "Local Shopper".

Revenue reasons to build Local Shopper
Opt-in e-mail has a very high growth rate on the Internet as a medium of advertising. PlaceLinks needs to tap into this business opportunity and help our customers use it, as easily and cost-effectively as possible. Response rates for e-mail as said to be 2-3 times comparable direct mail. Rates as high as 15% have been reported for high-context lists. We can't be left out!

Expense reasons to build Local Shopper
A new portal has a primary challenge to attract customers and achieve a high repeat use rate.

Local Shopper can reach out and remind registered consumers of the existence of PlaceLinks, therefore directly addressing the "forgetting effect" of people trying many web sites, and forgetting even those that they enjoyed using.

Web sites can also reduce their advertising costs by encouraging Word-of-mouth traffic whenever and wherever possible. In this case, Local Shopper is another vehicle for "refer a friend" and is "word-of email". In fact, since the reader gets Local Shopper as an email, they may be more actively willing to forward the message, which has links back to both the PlaceLinks site as well as the advertiser.

Pricing
Pricing could be on a performance basis or by time-within-geography like today's specials.

If by time, it can work on a daily basis like Syndication, scaled to the town where matches are attempted. The variability of a match is likely to be so high that we may be forced into constructing a performance pricing basis. (this means pay by results - see price model05.doc for explanation of terms)

The value of an e-mail to a vendor could be highly variable too. For example, stock brokers pay about $100-$200 for new clients, so numbers might be small but value would be high, compared to, say, a coupon distrbution.

Issue: Should we auction keywords daily in a place?

Arnold Kraft bought auction software for $50k, leased!

Feature Requirements

The basic requirement is to capture shopping keywords from consumers, match them to specials-type promotions and send mail to the consumer.

A process view is:

1. Construct
   Allow the Advertiser to easily construct a commercial e-mail message
2. Promote
   the existence of a Shopper Service in the Consumer System, and as a benefit reason, ask the consumer to register / sign up
3. Register Consumer
   Provide the registration dialog, showing sample ads again on the right a reason to register, and providing the forms to signal buying agenda, and the contact and demographic information.
4. Track registration response
   for PlaceLinks, because we want to maximize registration success, and explore how registrants track through the screens, and where they drop out
5. Consumer Maintains
   his/her own keywords, and PlaceLinks provides a mechanism for the consumer to maintain the record of his/her buying agenda and preferences
6. Match supply and demand
   of consumer preferences to retail offers
7. Send e-mail
   to the matched consumers
8. Track response
   by recording impressions for our advertisers; the basic actions on direct e-mail, namely response rates at key stages of 1) seeing, 2) opening and 3) responding to the mail.
9. Display Results
   The Advertiser should be able to measure the results through the Traffic Manager
10. PlaceLinks administrates Local Shopper
    measures and displays, so PlaceLinks can see rates of response, match rates, and the failure points in the dialog.

SAMPLE EMAIL to: Joan Everywoman from: PlaceLinks Local Shopper date: 1/1/2000

Subj: New, Soft Collar Shirt from Brooks Brothers

This mail is never sent un-solicited - see below.

BROOKS BROTHERS CELEBRATES 180 YEARS
An Innovator of Classic American Style

Local Shopper

New, Soft Collar Shirt

Paired with a tie for a dressier look or without for a more relaxed feel. Our new soft collar shirt is essential for Fall! Stop by our store on Main St. Plus a free gift at Brooks Brothers.

Offer valid while supplies last. Use your Brooks Brothers credit card to reserve.
Sizes 14-17 only.
Valid from 1 Jan 2000 to 31 Jan 2000

Why not send this offer to a friend?

Mail me a map and directions to store

Brooks Brothers

125 Main St

Wellesley MA 02116

(781) 235 1999

| Brooks Brothers | keyword found this for you through PlaceLinks Local Shopper (sm) | |
|---|---|---|
| find me more | for this store in | Wellesley |
| search neighboring towns for this item | | |

| | |
|---|---|
| add a new keyword to my Search List | |
| change my Search List in Local Shopper | unsubscribe to Local Shopper |
| delete this keyword from my list | email Local Shopper Customer Service |
| refer a friend to PlaceLinks Local Shopper | |

© PlaceLinks 1999-2000. Portions copyright Acxiom, Val-Pak, Mapquest.

SAMPLE EMAIL AS PLAIN TEXT

```
to:    Joan Everywoman
from:  PlaceLinks Local Shopper
date:  1/1/2000
```

Subj: New, Soft Collar Shirt from Brooks Brothers

This mail is never sent un-solicited - see below.

---

Brooks Brothers

BROOKS BROTHERS CELEBRATES 180 YEARS

An Innovator of Classic American Style

New, Soft Collar Shirt

Paired with a tie for a dressier look or without for a more relaxed feel. Our new soft collar shirt is essential for Fall! Stop by our store on Main St. Plus a free gift at Brooks Brothers.

Offer valid while supplies last. Use your Brooks Brothers credit card to reserve. Sizes 14-17 only.

Valid from 1 Jan 2000 to 31 Jan 2001

| Take me to a picture > | www.brookesbrothers.com/123bdqehr |
|---|---|
| Take me to map and directions > | www.placelinks.com/klajfvakjna.html |

Brooks Brothers

125 Main St

Wellesley MA 02116

(781) 235 1999

---

| Brooks Brothers keyword found this for you through PlaceLinks Local Shopper (sm) | |
|---|---|
| find me more       for this <store> in Wellesley> | www.placelinks.com/9872591874 |
| search neighboring towns for this item      > | www.placelinks.com/9872591874 |
| add a new keyword to my Search List      > | www.placelinks.com/jhqwegh741 |
| change my Search List in Local Shopper    > | www.placelinks.com/jhqwakjna. |
| delete this keyword from my list             > | www.placelinks.com/jhqwegh74a |
| refer a friend to PlaceLinks Local Shopper > | www.placelinks.com/jhqwegna.h |
| unsubscribe to Local Shopper                 > | www.placelinks.com/jhq41-vakj |
| email to Local Shopper Customer Service      > | www.placelinks.com/jhq741-vak |

© PlaceLinks 1999-2000. Portions copyright Acxiom, Val-Pak, Mapquest.

Construct

The Specials Editor provides most of the functionality we need for Local Shopper. (see data model on next page, and sample emails above). The word NEW below shows a new feature compared to today's Specials Dialog.

NEW: Syndication for e-mail should be distinct from the list for listings. The user interface could be an exact copy of the one for listings.

NEW: Graphics.

- Issue: Do we launch without graphics?
Graphics would add a lot to the value of this medium and would fully exploit the rich HTML opportunity Adding graphics to the business system and managing them could be a challenge.
    I recommend we standardize a layout to allow some standard size graphic elements

Title graphic – similar to banner proportion "Brookes Brothers"
    Item graphic – thumbnail size graphic in middle of copy next to Offer text
    Right Bar graphic – larger portrait size graphic that allows more creative flexibility and a larger palette.

NEW: A hyperlink feature has been specified that can be embedded into the offer text. This permits very flexible actions to be done through the offer text, while making the language natural – see example. For example, we could detect hyperlink text by creating our own XML extension to put around text typed into the form.
    Visit &&our store=www.placelinks.com/new visitor.htm&& and see what you can buy.

NEW: There should be a language setting variable – this should apply to the whole system not simply to Local Shopper. This allows Local Shopper to deliver in the appropriate language and to block others.

Note: PlaceLinks will need this for growth internationally. Also, Dept of Census projects Spanish descent will be $50mil people by 2050 –the largest minority in USA.

NEW: Keyword typing. Although all the keywords here are implicitly of type "hidden", I think we should be typing visible/hidden separately from the types that indicate marketing role.

NEW: mail me map and directions to store         hyperlink and URL. See example page.

NEW: Navigation and management URLs
    find me more URL                    URL to act as effectiveness measure for advertiser. A measure of consumer "appetite" for this type of offer.

search neighboring towns for this item URL    URL launches PlaceLinks and uses these keywords to search neighboring towns from the town in this email. This also writes a flag to place this consumer in another town as a virtual inhabitant. (see data model)

add a new keyword to my Search List URL          URL is a management URL taking the consumer back to his profile (if we can cookie them in the URL or elsewhere) or back to the consumer login screen.

change my Search List in Local Shopper URL          URL is a management URL taking the consumer back to the Search List his profile to change keywords delete this keyword from my list URL          sends a message to delete this keyword, (can we do this without going to the site?)

refer a friend to PlaceLinks Local Shopper          URL opens a form which looks like an email and sends a message (email to a friend format) that has a link to the Local Shopper first page.

Unsubscribe to Local Shopper          un-subscribe – positioned carefully to reduce response from page.

email to Local Shopper Customer Service          basic customer service – suggest we use this to capture user response at start, even if it gets too busy to handle afterwards. Mouseover text could be "Ideas, Suggestions, Problems)

CONSUMER REGISTRATION SCREENS – IN ORDER

Local Shopper ᴿᴹ

Sign-up to get Shopping Ideas about your favorite brands, stores, product categories and activities.

Then ideas will start to arrive by email. You can stop or change at any time. PlaceLinks matches your interests with great ideas in your neighborhood --
so you get the latest news and the very best values.

How to Get Started with PlaceLinks Local Shopper
Any important shopping activities that you need to get done?
* a vacation ?
* a birthday present ?
* a new child ?
* a favorite local store?

Register Now !

*Show me examples?*

New, Soft Collar Shirt
Paired with a tie for a dressier look or without for a more relaxed feel. Our new soft collar shirt is essential for Fall! Stop by our store on Main St. Plus a free gift at Brooks Brothers.

Victoria's Secret
Semi-Annual Sale and
Clearance
It's the perfect time to pamper yourself or a friend: Enjoy savings of up to 50% on your favourite styles from our world-famous collections. And now there are two ways to shop the sale - you can search by size or browse our store on Walnut St.

*This page promotes Local Shopper with a vision of what you will find – how comes later*

Local Shopper ᴿᴹ

PlaceLinks

How to Use PlaceLinks Local Shopper

Tell us about what you like.
* a vacation ?
* a birthday present ?
* a new child ?
* a favorite local store ?
* a favorite hobby / activity (dancing, football, collecting) ?

Type in some keywords. On-target e-mail coming your way !

*Two of our great offers...*

New, Soft Collar Shirt

Victoria's Secret
Semi-Annual Sale and
Clearance

Keywords about things I am looking for

[ _____ ] [ Brand ▼ ]

Make *Local Shopper* smarter by telling us about the keyword.
Examples:
  Reebok - *brand*    Plumbing - *service*
  Candle - *product*  Sailing - *activity*
  Starbucks - *store*

Need Hints for brands to pick?
click by category

| Apparel | Food/Drink |
|---|---|
| Bath/Beauty | Music |
| Computers | Toys |
| Electronics | Video/DVD |

Your Search List

| Keywords | Type | Change | |
|---|---|---|---|
| The Woman's Store | favorite store | how often | delete |
| Reebok | brand | how often | delete |
| Candle | product | how often | delete |
| Child Care | service | how often | delete |
| Sailing | activity | how often | delete |

[ Remember keywords and stores ]

Brands by Name?
A B C D E F G H I J K L M N O P Q R S T U V W X Y Z #

Need Hints for Stores?
Toys R Us    more ...
Eddie Bauer
Gap
Victoria's Secret

*Personal Management Page 1*

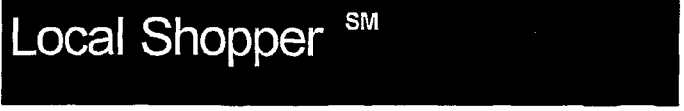   
Hints
Search by brand, product, business name
[                                    ] [Go!]
○ Business    ○ Brand    ○ Product    ○ Service    ○ Activity
Where are you?
Town: [          ▼]   State: [    ▼]
Browse brands by name
A B C D E F G H I J K L M N O P Q R S T U V W X Y Z #
*Hints Page*

 
How often do you want news from Local Shopper?
You are in control - do this now or pick later.
[Don't care]
Your Search List - How often?
| Keywords | daily | weekly | monthly | when you have something |
|---|---|---|---|---|
| The Woman's Store | ☐ | ☐ | ☐ | ☑ |
| Reebok | ☐ | ☐ | ☐ | ☑ |
| Candle | ☐ | ☐ | ☐ | ☑ |
| Child Care | ☐ | ☐ | ☐ | ☑ |
| Sailing | ☐ | ☐ | ☐ | ☑ |
[Register]
*Personal Management Page 2*

Local Shopper ℠

Information about you

This information helps Local Shopper to match you with the right products and services. We promise to keep it confidential.

Check our privacy policy.

| | |
|---|---|
| E-mail (e.g. name@website.com) | |
| First Name? | |
| I prefer to receive HTML rich e-mail | ☑ Yes  ☐ No, my email likes plain text |
| Date Birth (mo-day -yr) | |
| Gender | ☐ Male  ☐ Female |
| Children at home? | Pick one option ▼ |
| Boys / Girls ? | Pick from list ▼ |
| Street Address - home | |
| City | |
| State | ▼ |
| Zip code - home | |

If you like to shop around work, please give us that town or zip too

| | |
|---|---|
| City - where I work | |
| State | ▼ |
| Zip code - work | |

Get promotional offers from other companies?    ☑ Yes    ☐ No, only from PlaceLinks

Thanks for Registering - lots of smart shopping coming your way !

Go to home page!

Data Model

| Variable name in LS data model | In Data Model today? | Definition | Displayed in CS? | Example |
|---|---|---|---|---|
| SPECIALS ENTITY | | | | |
| Syndication list for e-mail | | list of place l.d.s | | <> same list for listing |
| Offer Title | y | Heading in specials and email subject line | y | New, Soft Collar Shirt from Brooks Brothers |
| Offer Text | y | Marketing selling text describing offer | y | |
| Offer Text hyperlink visible text | | | y | "our store" in example |
| URL | | URL under visible text | | www.xyz.com+parameters |
| Title graphic | | Bit map in standard position | y | |
| Title graphic subhead | | Subhead | y | BROOKS BROTHERS CELEBRATES 180 YEARS etc etc |
| Item graphic | | Bit map in standard position | y | |
| Right Bar graphic | | Bit map in standard position | y | |
| Disclaimer | y | Text for disclaimer | y | "One per family" |
| Redeemable from date | y | Consume field for validity of offer | y | |
| Redeemable to date | y | Consume field for validity of offer | y | |
| Promotion from date | y | Email (special) published dates | | |
| Promotion from date | y | Email (special) published dates | | |
| Directions to store URL | | URL pointing to the Directions page in PL web site. | y - text | |
| Time of Day | y | Publishing option for ... | | |
| Age Category | y | Publishing option for ... | | |
| Gender | y | Publishing option for ... | | |
| Rating | y | Publishing option for ... | | |
| Language setting | | Publishing option for ...browser language | | lang=spanish US |
| Send email to Local Shopper? | y | Publishing option for ... | | |
| Keyword 1 format type | | Hidden | | |
| Keyword 1 | y | Keyword | | |
| Keyword type 1 | | Type; brand, product, service, store, activity | | |
| Keyword 2 | y | Keyword | | |
| Keyword type 2 | | Type; brand, product, service, store, activity | | |
| Keyword 3 | y | Keyword | | |
| Keyword type 3 | | Type; brand, product, service, store, activity | | |
| Keyword 4 | y | Keyword | | |
| Keyword type 4 | | Type; brand, product, service, store, activity | | |
| Keyword 5 | y | Keyword | | |
| Keyword type 5 | | Type; brand, product, service, store, activity | | |
| find me more URL | | URL to act as effectiveness measure for advertiser | y - text | |
| search neighboring towns for this item URL | | URL to have this effect | y - text | |
| add a new keyword to my Search List URL | | URL to have this effect | y - text | |
| change my Search List in Local Shopper URL | | URL to have this effect | y - text | |
| delete this keyword from my list URL | | URL to have this effect | y - text | |
| refer a friend to PlaceLinks Local Shopper URL | | URL to have this effect | y - text | |
| unsubscribe URL | | URL to have this effect | y - text | |
| email to Local Shopper Customer Service URL | | URL to have this effect | y - text | |

| Variable name in LS data model | In Data Model today? | Definition | Displayed in CS? | Example |
|---|---|---|---|---|
| CONSUMER / OFFER JOIN ENTITY | | | | |
| Keyword message I.d.s sent already | ? | one or many offer I.d.s | | |
| Keyword message I.d.s sent dates | ? | one or many offer I.d.s sent dates | | |
| Consumer I.d. | ? | unique I.d. for LS shopper | | from cookie |
| | | | | |
| CONSUMER ENTITY | | | | |
| Consumer id | | unique I.d. for LS shopper | | from cookie |
| Keyword picks 1-5 | | keyword text | | |
| Keyword picks 1-5 type | | Type; brand, product, service, store, activity | | |
| | | | | |
| CONSUMER / KEYWORD / TOWN ENTITY | | | | |
| Consumer towns to search for this keyword | | list of towns where consumer wants to search. Default is the consumers own place. | | |

Promote
The Local Shopper starting page has to promote with a visualization of the goods available in the area – it just will not work to describe the benefits in the abstract. We have to show a sample of what is on offer.

This sample offers page is maintained by hand by PlaceLinks marketing people from a sampling of current offers.

If a consumer has a Local Shopper cookie, he/she goes straight to the Local Shopper personal management page, bypassing page one. This also promotes, with the sample of some current offer titles on the right at the top. – see example.

Register Consumer
The registration process is on 4 pages.

Personal management page 1– the start of the keyword management process
I have given a lot of though to the consumer language here to make it as simple and clear as possible. For example, the internal jargon, "base listing" is not shown – just "store / business".
Remember keywords button brings you to the "how often" page.

NEW: "how often" link is added to the present delete column of the form. This branches to management page 2 which allows people to specify a how often the consumer wants to see e-mails on the keyword topic – this idea got a good response in the focus groups.

Stores are added to the "search List" via the consumer system too. We have to align the words used to describe each. The word "Favorites" is not used here, though it is a good word. Maybe we make it more obvious by listing stores as "favorite store" in the list?

Your Search List

| Keywords | Role | Change | |
|---|---|---|---|
| The Woman's Store | favorite store | how often | delete |
| Reebok | brand | how often | delete |
| Candle | product | how often | delete |
| Child Care | service | how often | delete |
| Sailing | activity | how often | delete |

Hints page, as a branch off the first page
The main purpose of hints is to let people with bad memories or no clear shopping agenda browse for ideas.

Personal management page 2– "How often?"
allows people to specify a frequency response to the topic – this got a good response in the focus groups. This defaults to "when you have something". People who reset are scheduled with a target date in the matching system.

Information about You
This title is carefully chosen to be less threatening than "profile". The TRUSTe logo is displayed prominently.
Date of birth, not a date range is used, so we can send a birthday email to Local Shopper users – this gets great response I hear.
A special hyperlink addresses the legal issue of under 13's giving personal information, even if it's not published.

"Children at home" allows us to target the kids markets. Pick options are …
    Pick one option
    None
    Infant(s)
    Under 13
    Teenager(s)
    Adult(s)
    Several age groups Boy/Girl allows PlaceLinks to target the children more accurately when combined with item above, without asking for a detailed list, child by child of age and sex.
    Pick from list
    Boy(s)
    Girl(s)
    Both Issue: Will street address reduce response?
    Personally I think asking for street address will reduce response significantly, though I left it in – we can test with / without. We should field the data, because we may need it for a future valid use, e.g. helping with delivery services.

Work city, state and zip put in to capture the opportunity for PlaceLinks to offer "sausage " search later.

Track Registration Response
One critical success factor with e-mail is knowing why and where you are failing. We should log every form step, so we can see where in the registration process we get the biggest drop-out. For example, if people drop out of the profile info, that is potentially caused by asking "too many questions / too private".

Consumer Maintains
Consumer self-maintenance should be easy if ...
1. we make the pages 1 and 3 easy to use and
2. give them URLs in the e-mails to get back directly and change/update their Search List words/frequencies.

Match Supply and Demand
Local Shopper demand /supply engine will work in a batch mode. It implements ...
1. For each place, matching offers to consumers via keywords
2. eliminating consumers with constraints supplied by the supplier
3. regulating the frequency of messages to the consumer
4. any consumer gets an offer only once.
5. Every day, assembling sub-batches of lists to mail in the required time-of-day period Queries are driven from the supply side for ease of query – there are fewer offers than readers.

For each offer while valid, daily
1. For each place, construct a sample of people in the syndication list for the e-mail trading area geography - need for syndication step in Local Shopper! To deal with low numbers, construct 2 lists – where actually syndicated and "N" (neighbors) list if # matches are low. Match the list actually syndicated first – keep the other in reserve.
2. Test age and gender fit on the list
3. Query the consumer / offer table for keyword match in profiles
4. Sent this offer i.d. already? – ignore this consumer
5. "How Often" measure – test versus date on last message on this keyword. "When you have it" allows immediate e-mail to be sent without a restriction from the consumer.
6. Assemble the day's e-mail list, and subdivide it by time of day for that day. The default of "anytime" will be sent to optimize the likelihood of reading, which tends to be early afternoon – check this with the best practices e-mail file from the DMA seminar.
7. Send the mail
8. Assemble a log file similar to the consumer / offer record, which records e-mails actually opened, to allow for traffic reporting.
9. Analyze the consumer / offer record for any nul entries to report on "no-match".
10. Run daily "no-match" analysis – see below for explanation.

Issue: lack of matches:
We will likely evolve some algorithms for forcing "near hits". We either let the advertiser propose a match (e.g. by adopting his competitors keywords!! – do we stop this?), or let the consumer know we have a near hit by category + brand or product type + brand. The first thing to relax is the place requirement.

Process Design: Reports of no-matches on brands and products
requested by consumers is given to sales to canvass business on this basis from typical providers of these brands. Similarly, reports of offers with no matches are promoted to PlaceLinks customers in various ways, including setting up PlaceLinks-authored specials on the site.

Send E-mail
I do not have many observations on this.

We will log unsuccessful e-mails, and if non-delivery persists we may take some action eventually to remove them from the list or mark them non-responsive.

Track Response
PlaceLinks server should log the behavior-related actions described in other sections, as an extension of the Traffic Manager functionality.

Display Results
Results display will show how many eyeballs saw the email, as a total, and arranged by "reason", just like the Traffic manager format we have – see example on next page.

Example – author's notes in green

<Business Owner>

Local Shopper Results for <report date start> to <report date end>

<Offer Title>     <Start date> to <End Date>
Deliveries
310     Total Message Successful deliveries to consumer's mail server (total first time plus forwarded to a friend)
        of which,
Impressions
Delivered to recipient (title viewed) .................................................................................. 100%
300     Message opened .................................................................................................. 90%
280     Browsed down full message [can we pick up use of the slider easily in rich HTML?] 85%
        of which,
        Actions
        260     Took click-through action <title from email>.................................................. 75%
        100     Requested map and directions [URL to store's map and direction page]........ 35%
        90      search neighboring towns for this <search type>.......................................... x%
        101     find me more for this <brand/product/etc> in <placename> ......................... x%
        120     offer sent to a friend ..................................................................................... x%
        43      delete this keyword from their list ................................................................ x% these totals visible only for PlaceLinks, to see if certain e-mails are causing large numbers of un-
subscribe behavior, or customer service load
        3       unsubscribe .................................................................................................. x%
        2       email to Local Shopper Customer Service ................................................... x%

Why Found
300     Message opened .................................................................................................. 90%
        Reasons
        261     <keyword 1>................................................................................................. 75%
        101     <keyword 2>................................................................................................. 35%
        90      <keyword 3>................................................................................................. x%
        101     <keyword 4>................................................................................................. x%
        120     <keyword 5>................................................................................................. x%

Where Found
300     Message opened .................................................................................................. 90%
        Places
        262     <place name>............................................................................................... 75%
        102     <place name>............................................................................................... 35%
        90      <place name>............................................................................................... x%
        101     <place name>............................................................................................... x%
        120     <place name>............................................................................................... x%

PlaceLinks administrates Local Shopper

Some obvious administration issues arise:

1. Refreshing the "promote" page in each major geography. Offers displayed may be in the general area (Boston not just Wellesley but not out of state)
2. Inspecting content for undesirable businesses / offers.
3. Reporting on offers with no matches
4. Reporting on number of consumers with "no-match in last n days"
5. Reporting on "orphan keywords" by frequency, further refined by a separate report on orphan keywords only on "no-match" people, so that each selling effort to create an offer will do the most to reduce the number of no-match consumers.

Business Processes
- We can mine the lists to suggest new stores to sign up for the service.
- We can mine for orphan consumer's keywords and orphan offers, as described.
- We filter offers for undesirable text. We put a disclaimer on the business system dialog allowing us to remove an offer from publication.
- We implement the requirements of the TRUSTe license.

Data capture opportunities
1. When the consumer send a Local Shopper page to a friend, their email is automatically registered with PlaceLinks Local Shopper, with no search text ("favorites", "wish list") populated. We send them a greeting 2-3 days later inviting them to enter their own search list.

Patent Opportunities
We are starting to see many varieties of this keyword match style of shopping. We need more time to study them in detail to help guide our efforts.

- The place expansion routine may well be unusual.
- The format and style of our e-mails may be patent-able – Coolsavings has done it.

Semantic search taxonomies of shopping terms hold out the promise for much higher match rates.

End

The invention claimed is:

1. A consumer enquiry system, comprising:
   a geography based collaborative linking environment including one or more geographic content servers and databases for linking consumers and providers;
   a provider listing including at least one searchable fixed criterion and at least one searchable variable criterion, said provider listing mappable into one or more of the geographic content servers;
   a provider interface in communication with the collaborative linking environment, the provider interface configured for display and modification of at least the variable criterion of the provider listing; and
   a consumer interface in communication with the collaborative linking environment, the consumer interface configured to accept consumer geographic preferences and search enquiries and to provide search results identifying one or more provider listings responsive to the consumer geographic preferences and search enquiries.

2. The system of claim 1, wherein the at least on searchable fixed criterion include a business category.

3. Th system of claim 1, wherein the at least one searchable variable criterion include one or more keywords definable by the provider.

4. The system of claim 1, wherein the at least on searchable variable criterion include one or more promotional messages definable by the provider.

5. The system of claim 1, further comprising a consumer activity logger configured to create a record of consumer searches.

6. The system of claim 5, wherein the provider interface is also configured to display n activity log indicative of how consumer search enquiries have found the provider listing.

7. The system of claim 1, wherein said geographic preference is identifiable by at least one of: postal codes; telephone area codes; telephone exchanges; a circle defined by longitude and latitude values; and a set of points each with a longitude and latitude values; governmental census tracks identifiers; and a set of other geographic regions.

8. A computer implemented method allowing a provider to initiate and manage a promotional campaign in a geography based collaborative linking system including one or more geographic content servers and databases for linking consumers and providers, the method comprising:
   (a) providing an interface configured to receive provider information including at least one geographic preference and provider keyword data;
   (b) mapping said provider keyword data into one or more of the geographic content servers and databases of the collaborative linking system responsive to said at least one geographic preference, said geographic content servers and databases being searchable by consumers;
   (c) collecting consumer search activity including keyword hits; and
   (d) modifying said provider defined keywords in response to said logged consumer search activity.

9. The method of claim 8, wherein said provider information further comprises a category indicative of goods or services.

10. The method of claim 8, wherein said provider information further comprises product information.

11. The method of claim 10, wherein said product information comprises one or more of: make; model; features; price; and quantity on hand.

12. The method of claim 8, wherein said provider information further comprises target consumer information for a geographic region.

13. The method of claim 12, wherein said geographic region is definable by at least one of: postal codes; telephone area codes; telephone exchanges; a circle defined by longitude and latitude values; and a set of points each with a longitude and latitude values; governmental census tracks identifiers; and a set of other geographic regions.

14. The method of claim 12, wherein said target consumer information comprises on or more of: average household income; number of homeowners, political affiliation; religious affiliation; and other census information.

15. The method of claim 8, wherein said logged consumer search activity comprises one or more of: number of "hits"; consumer preferences; and consumer search patterns.

16. The method of claim 8, wherein said provider keyword data is mapped into the geographic content servers and databases according to a related geographic region, the geographic content servers and databases being defined according to a geographic region.

17. The method of claim 16, wherein said geographic region is definable by at least one of: postal codes; telephone area codes; telephone exchanges; a circle defined by longitude and latitude values; and a set of points each with a longitude and latitude values; governmental census tracks identifiers; and a set of other geographic regions.

18. The method of claim 8, further comprising forwarding to consumers with said portion of said mapped provider data, a special promotion in response to consumer searches.

19. The method of claim 18, wherein the special promotions include at least one link to a provider's own internet page.

20. A geography based collaboratve linking system comprising:
   a provider interface configured to receive from a provider of goods and services provider information including at least one geographic preference and keyword data;
   one or more geographic content servers and associated content databases in communication with the provider interface, said one or more geographic content servers and associated content databases configured to map thereon the received provider keyword data;
   a consumer interface in communication with the one or more geographic content servers and associated content databases, said consumer interface configured to receive search requests for goods and services associated with a user defined geographic point of interest and to return search results obtained from the mapped provider data within a geographic region related to the user-defined geographic point of interest; and
   an activity logger configured to record consumer search activity related to use of the collaborative linking system, wherein the provider selectively updates provider keyword data through the provider interface in response to logged consumer search activity, thereby allowing the provider to manage a promotion through section of keywords.

21. The system of claim 20, wherein said geographic region is definable by at least one of: postal codes; telephone area codes; telephone exchanges; a circle defined by longitude and latitude values; and a set of points each with a longitude and latitude values; governmental census tracks identifiers; and a set of other geographic regions.

22. The system of claim 20, further comprising a control center in communication with said one or more geographic content servers and associated content databases, said one or more geographic content servers and associated content databases linked together under management of the control center.

23. The system of claim 22, wherein said one or more geographic content servers and associated content database are linked together under management of the control center are accessible via the Internet.

24. The system of claim 20, wherein said one or more geographic content servers and associated content databases are defined according to respective geographic regions within a larger geography-based system, wherein said provider data is mapped into those geographical content servers and databases corresponding to said provider's at least one geographic preference.

25. A computer implemented method in a geography based collaborative linking system allowing a provider of goods and services to initiate and manage a promotional campaign, the method comprising:
receiving from the provider at least one geographic preference and promotional information;
mapping said promotional information into one or more geographic content servers and associated databases of the geography based collaborative linking system according to the at least one geographic preference;
receiving from a consumer geographic point of interest and a search request for goods and services associated with the geographic point of interest; and
selectively forwarding said promotional information from at a one of said geographic content servers and associated databases to said consumer as function of said geographic point of interest and said search request.

26. The method of claim 25, wherein said promotional information includes one or more promotional terms and said consumer search request includes one or more search terms, said promotional information being selectively forwarded in response to at least one search term matching at least one promotional term.

27. The method of claim 25, wherein said forwarded promotional information is presented to said consumer in a reserved area of a search results presentation.

28. The method of claim 25, wherein said geographic point of interest is definable by at least one of: postal codes; telephone area codes; telephone exchanges; a circle defined by longitude and latitude values; and a set of points each with a longitude and latitude values; governmental census tracks identifiers; and a set of other geographic regions.

29. A method for providing a consumer with an opt-in service to manage receipt of commercial e-mail messages, comprising:
receiving by a traffic manager a consumer's buying preference;
anonymously storing by the traffic manager the received consumer's buying preference, such that the stored consumer's buying preference is not known to an advertiser;
receiving by the traffic manager an e-mail offer message from the advertiser; and
selectively forwarding by the traffic manager to the consumer a commercial e-mail message responsive to the consumer's stored buying preference, the commercial e-mail message including at least a portion of the advertiser's e-mail offer message,
wherein receipt by the consumer of the commercial e-mail message is manageable by the consumer's buying preference.

30. The method of claim 29, wherein the consumer's buying preference includes at least one keyword indicative of a brand, a product, a service, a store, or an activity.

31. The method of claim 29, further comprising measuring by the traffic manager in aggregate the consumer's impression to the selectively forwarded commercial e-mail message, the aggregate being reportable to the advertiser without compromising anonymity of the consumer.

32. The method of claim 29, further comprising receiving from the advertiser at least one advertiser criterion, the step of selectively forwarding the commercial e-mail message to the consumer including matching at least a portion of the consumer's buying preference to the at least one advertiser criterion.

33. The method of claim 32, further comprising identifying within the commercial e-mail message the at least one advertiser criterion matching the consumer's buying preference.

34. The method of claim 29, further comprising:
receiving by the traffic manager the consumer's personal information;
anonymously storing by the traffic manager the received consumer's personal information, such that the stored consumer's personal information is not known to an advertiser; and
receiving from the advertiser target demographics, wherein selectively forwarding a commercial e-mail message to the consumer includes: (i) matching at least a portion of the consumer's buying preference to the at least one advertiser criterion; and (ii) matching the advertiser's demographics to the consumer's personal information.

* * * * *